US012565545B2

(12) United States Patent (10) Patent No.: US 12,565,545 B2
McDaniel et al. (45) Date of Patent: Mar. 3, 2026

(54) PARTICLE SIZE CONTROL OF SILYL CHROMATE CATALYSTS AND USES THEREOF IN FLUIDIZED BED REACTORS

(71) Applicant: Chevron Phillips Chemical Company LP, The Woodlands, TX (US)

(72) Inventors: Max P. McDaniel, Bartlesville, OK (US); Eric D. Schwerdtfeger, Bartlesville, OK (US); Jeffrey S. Lowell, Kingwood, TX (US); Scott E. Kufeld, The Woodlands, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 18/914,375

(22) Filed: Oct. 14, 2024

(65) Prior Publication Data

US 2025/0236687 A1 Jul. 24, 2025

Related U.S. Application Data

(62) Division of application No. 18/653,014, filed on May 2, 2024.

(60) Provisional application No. 63/623,889, filed on Jan. 23, 2024.

(51) Int. Cl.
*C08F 4/78* (2006.01)
*C08F 4/02* (2006.01)
*C08F 10/02* (2006.01)

(52) U.S. Cl.
CPC ................ *C08F 4/78* (2013.01); *C08F 4/025* (2013.01); *C08F 10/02* (2013.01)

(58) Field of Classification Search
CPC ................................... C08F 4/78; C08F 4/025
See application file for complete search history.

(56) References Cited

U.S. PATENT DOCUMENTS

| | | | |
|---|---|---|---|
| 3,242,099 A | 3/1966 | Manyik | |
| 3,248,179 A | 4/1966 | Norwood | |
| 4,501,885 A | 2/1985 | Sherk | |
| | (Continued) | | |

FOREIGN PATENT DOCUMENTS

| | | |
|---|---|---|
| EP | 1003792 | 12/2001 |
| EP | 3808448 | 4/2021 |
| | (Continued) | |

*Primary Examiner* — Catherine S Branch
(74) *Attorney, Agent, or Firm* — Merchant & Gould P.C.

(57) ABSTRACT

Supported chromium (VI) catalysts containing a solid oxide, 0.05 to 5 wt. % chromium, and 0.2 to 20 wt. % carbon, in which the solid oxide or the catalyst has a particle size span from 0.5 to 1.4, less than 3 wt. % has a particle size greater than 100 μm, and less than 10 wt. % has a particle size less than 10 μm, can be contacted with an olefin monomer in a fluidized bed reactor or other suitable polymerization reactor to produce an olefin polymer. Representative ethylene-based polymers produced using the chromium catalysts have a HLMI of 4 to 70 g/10 min, a density from 0.93 to 0.96 g/cm$^3$, from 150 to 680 ppm solid oxide (such as silica), from 0.5 to 3 ppm chromium, and a film gel count of less than 15 catalyst particle gels per ft$^2$ of 25 micron thick film and/or a gel count of less than or equal to 50 catalyst particles of greater than 100 μm (in diameter) per five grams of the ethylene polymer.

20 Claims, 12 Drawing Sheets

(56)                References Cited

U.S. PATENT DOCUMENTS

| | | | |
|---|---|---|---|
| 4,588,790 A | | 5/1986 | Jenkins, III |
| 4,794,096 A | | 12/1988 | Ewen |
| 4,808,561 A | | 2/1989 | Welborn, Jr. |
| 5,317,036 A | * | 5/1994 | Brady, III ................ B01J 8/382 |
| | | | 526/158 |
| 5,352,749 A | | 10/1994 | Dechellis |
| 5,436,304 A | | 7/1995 | Griffin |
| 5,565,175 A | | 10/1996 | Hottovy |
| 5,575,979 A | | 11/1996 | Hanson |
| 5,576,259 A | | 11/1996 | Hasegawa |
| 5,807,938 A | | 9/1998 | Kaneko |
| 5,919,983 A | | 7/1999 | Rosen |
| 6,022,933 A | * | 2/2000 | Wright .................... C08F 10/02 |
| | | | 526/127 |
| 6,239,235 B1 | | 5/2001 | Hottovy |
| 6,262,191 B1 | | 7/2001 | Hottovy |
| 6,833,415 B2 | | 12/2004 | Kendrick |
| 7,294,599 B2 | | 11/2007 | Jensen |
| 7,381,780 B2 | * | 6/2008 | Apecetche .............. C08F 10/00 |
| | | | 502/103 |
| 7,531,606 B2 | | 5/2009 | Hendrickson |
| 7,598,327 B2 | | 10/2009 | Shaw |
| 7,601,665 B2 | | 10/2009 | McDaniel |
| 7,884,163 B2 | | 2/2011 | McDaniel |
| 8,114,946 B2 | | 2/2012 | Yang |
| 8,309,485 B2 | | 11/2012 | Yang |
| 8,822,608 B1 | | 9/2014 | Bhandarkar |
| 8,946,117 B2 | * | 2/2015 | Erfan ...................... B01J 35/51 |
| | | | 502/325 |
| 9,023,959 B2 | | 5/2015 | Mcdaniel |
| 9,303,103 B2 | | 4/2016 | Moorhouse |
| 9,540,460 B2 | * | 1/2017 | Lester ...................... C08F 4/02 |
| 10,414,843 B2 | | 9/2019 | Pannell |
| 10,682,797 B2 | | 6/2020 | Abe |
| 10,745,501 B2 | | 8/2020 | Gross |
| 10,787,526 B2 | | 9/2020 | Hendrickson |
| 10,913,831 B2 | | 2/2021 | Mure |
| 11,180,577 B2 | | 11/2021 | Cai |
| 11,325,997 B1 | | 5/2022 | Mcdaniel |
| 2006/0155081 A1 | * | 7/2006 | Jorgensen ............ C08F 210/16 |
| | | | 526/901 |
| 2006/0281879 A1 | | 12/2006 | Apecetche |
| 2022/0227897 A1 | | 7/2022 | Mcdaniel |

FOREIGN PATENT DOCUMENTS

| | | | | |
|---|---|---|---|---|
| EP | | 3831479 | 6/2021 | |
| WO | WO-2008045171 A2 | * | 4/2008 | .............. C08F 10/00 |

* cited by examiner

Catalyst Particle Diameter, μm

1

PARTICLE SIZE CONTROL OF SILYL CHROMATE CATALYSTS AND USES THEREOF IN FLUIDIZED BED REACTORS

REFERENCE TO RELATED APPLICATIONS

This application is a divisional application of U.S. patent application Ser. No. 18/653,014, filed on May 2, 2024, now U.S. Pat. No. 12,319,774, which claims the benefit of U.S. Provisional Patent Application No. 63/623,889, filed on Jan. 23, 2024, the disclosures of which are incorporated herein by reference in their entirety.

FIELD OF THE INVENTION

The present disclosure generally relates to polymerization processes for producing ethylene polymers, and more particularly, relates to the use of supported chromium (VI) catalysts with particular particle size attributes in fluidized bed polymerization processes.

BACKGROUND OF THE INVENTION

Improper particle size features of supported chromium (VI) catalysts can lead to operational difficulties during ethylene/$\alpha$-olefin polymerizations in fluidized bed reactors, as well as poor and inconsistent properties of the resulting polymer. It would be beneficial to develop chromium catalysts and polymerization processes that overcome these drawbacks. Accordingly, it is to these ends that the present invention is generally directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

The present invention generally relates to supported chromium (VI) catalysts and polymerization processes using the supported chromium (VI) catalysts. Such catalysts can comprise a solid oxide, from 0.05 to 5 wt. % chromium, and from 0.2 to 20 wt. % carbon. In one aspect, the solid oxide (or the catalyst) can have an amount of the solid oxide (or the catalyst) with a particle size greater than 100 μm of less than or equal to 3 wt. % and a particle size span ((d90−d10)/d50) in a range from 0.5 to 1.4, and in another aspect, an amount of the solid oxide (or the catalyst) with a particle size greater than 100 μm of less than or equal to 0.5 wt. % and an amount of the solid oxide (or the catalyst) with a particle size less than 10 μm of less than or equal to 10 wt. %.

Supported chromium (VI) catalysts can comprise a solid oxide and from 0.05 to 5 wt. % chromium, wherein the chromium has at least one triphenylsilyl ligand. In yet another aspect, the solid oxide (or the catalyst) can have an amount of the solid oxide (or the catalyst) with a particle size greater than 100 μm of less than or equal to 3 wt. % and a particle size span ((d90−d10)/d50) in a range from 0.5 to 1.4, and in still another aspect, an amount of the solid oxide (or the catalyst) with a particle size greater than 100 μm of less than or equal to 0.5 wt. % and an amount of the solid oxide (or the catalyst) with a particle size less than 10 μm of less than or equal to 10 wt. %.

Polymerization processes using the supported chromium (VI) catalyst can comprise contacting the catalyst and an optional co-catalyst with an olefin monomer and an optional olefin comonomer in a polymerization reactor system under polymerization conditions to produce an olefin polymer. While not limited thereto, often the polymerization reactor system can comprise a fluidized bed reactor.

Other aspects of this invention are directed to ethylene polymers (which are typically in the form of pellets or beads) characterized by a high load melt index (HLMI) in a range from 4 to 70 g/10 min and a density in a range from 0.93 to 0.96 g/cm³. These ethylene polymers can have a film gel count of less than or equal to 15 catalyst particle gels per ft² of 25 micron thick film and the ethylene polymer can contain from 150 to 680 ppm solid oxide (e.g., silica) and from 0.5 to 3 ppm chromium. Additionally or alternatively, the ethylene polymer can have a gel count of less than or equal to 50 catalyst particles of greater than 100 μm per 5 grams of the ethylene polymer, and the ethylene polymer can contain from 150 to 680 ppm solid oxide (e.g., silica) and from 0.5 to 3 ppm chromium.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects and embodiments may be directed to various feature combinations and sub-combinations described in the detailed description.

DEFINITIONS

Figure 1:
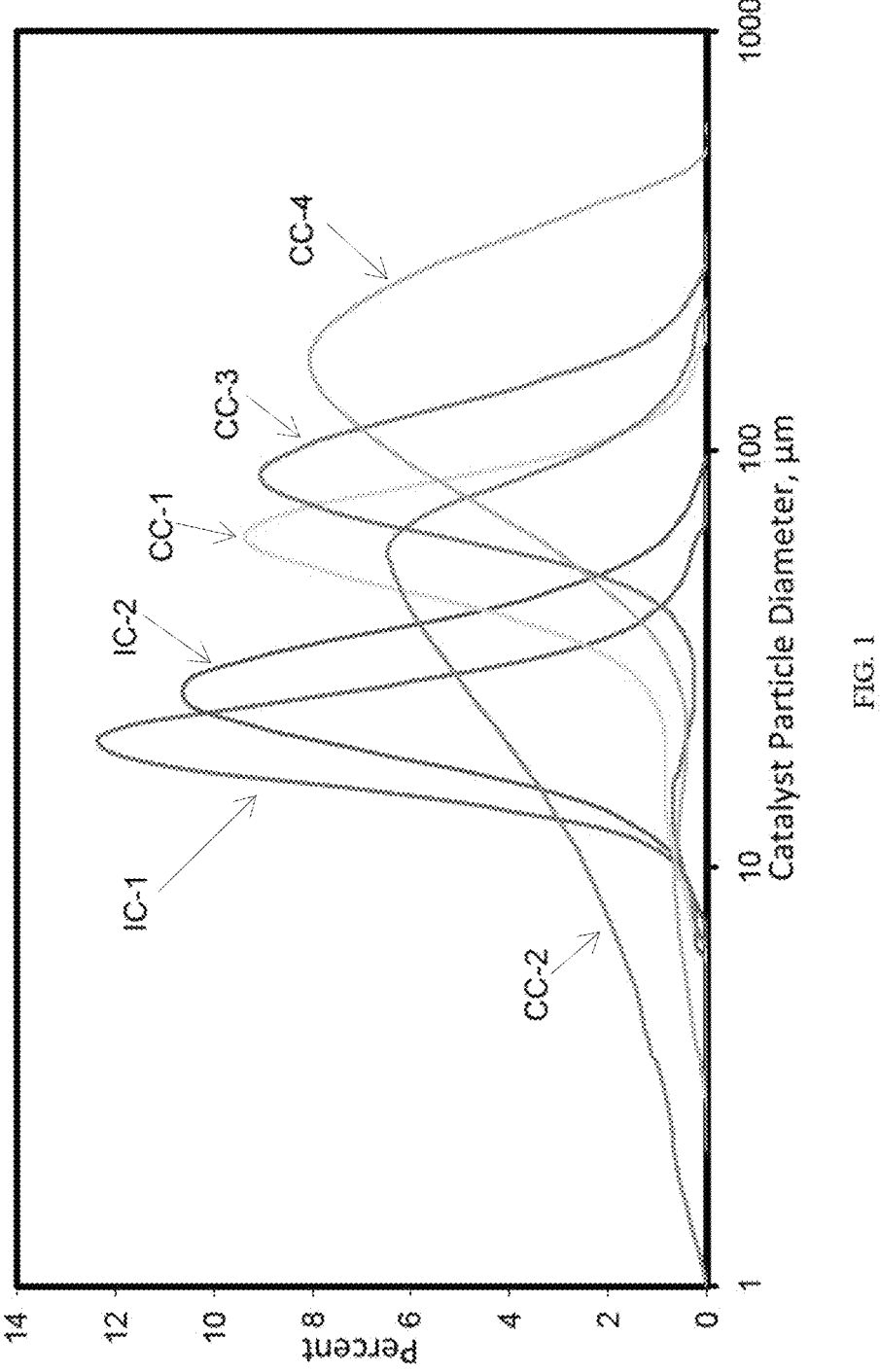
FIG. 1 presents a plot of the particle size distributions of Inventive chromium catalysts IC-1 and IC-2, and Comparative chromium catalysts CC-1, CC-2, CC-3, and CC-4.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter are described such that, within particular aspects, a combination of different features can be envisioned. For each and every aspect and/or feature disclosed herein, all combinations that do not detrimentally affect the designs, compositions, and/or methods described herein are contemplated with or without explicit description of the particular combination. Additionally, unless explicitly recited otherwise, any aspect and/or feature disclosed herein can be combined to describe inventive features consistent with the present disclosure.

While compositions and methods are described herein in terms of "comprising" various components or steps, the compositions and methods also can "consist essentially of" or "consist of" the various components or steps, unless stated otherwise. The terms "a," "an," "the," etc., are intended to include plural alternatives, e.g., at least one, unless otherwise specified.

Generally, groups of elements are indicated using the numbering scheme indicated in the version of the periodic table of elements published in *Chemical and Engineering News,* 63 (5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

For any particular compound disclosed herein, the general structure or name presented is also intended to encompass all structural isomers, conformational isomers, and stereoisomers that can arise from a particular set of substituents, unless indicated otherwise. Thus, a general reference to a compound includes all structural isomers unless explicitly indicated otherwise; e.g., a general reference to pentane includes n-pentane, 2-methyl-butane, and 2,2-dimethylpropane, while a general reference to a butyl group includes an n-butyl group, a sec-butyl group, an iso-butyl group, and a tert-butyl group. Additionally, the reference to a general structure or name encompasses all enantiomers, diastereomers, and other optical isomers whether in enantiomeric or racemic forms, as well as mixtures of stereoisomers, as the context permits or requires. For any particular formula or name that is presented, any general formula or name presented also encompasses all conformational isomers, regioisomers, and stereoisomers that can arise from a particular set of substituents.

The term "substituted" when used to describe a group, for example, when referring to a substituted analog of a particular group, is intended to describe any non-hydrogen moiety that formally replaces a hydrogen in that group, and is intended to be non-limiting. A group or groups can also be referred to herein as "unsubstituted" or by equivalent terms such as "non-substituted," which refers to the original group in which a non-hydrogen moiety does not replace a hydrogen within that group. Unless otherwise specified, "substituted" is intended to be non-limiting and include inorganic substituents or organic substituents as understood by one of ordinary skill in the art.

The term "hydrocarbon" whenever used in this specification and claims refers to a compound containing only carbon and hydrogen. Other identifiers can be utilized to indicate the presence of particular groups in the hydrocarbon (e.g., halogenated hydrocarbon indicates the presence of one or more halogen atoms replacing an equivalent number of hydrogen atoms in the hydrocarbon). The term "hydrocarbyl group" is used herein in accordance with the definition specified by IUPAC: a univalent group formed by removing a hydrogen atom from a hydrocarbon (that is, a group containing only carbon and hydrogen). Non-limiting examples of hydrocarbyl groups include alkyl, alkenyl, aryl, and aralkyl groups, amongst other groups.

The term "polymer" is used herein generically to include olefin homopolymers, copolymers, terpolymers, and the like, as well as alloys and blends thereof. The term "polymer" also includes impact, block, graft, random, and alternating copolymers. A copolymer is derived from an olefin monomer and one olefin comonomer, while a terpolymer is derived from an olefin monomer and two olefin comonomers. Accordingly, "polymer" encompasses copolymers and terpolymers derived from any olefin monomer and comonomer(s) disclosed herein. Similarly, the scope of the term "polymerization" includes homopolymerization, copolymerization, and terpolymerization. Therefore, an ethylene polymer includes ethylene homopolymers, ethylene copolymers (e.g., ethylene/α-olefin copolymers), ethylene terpolymers, and the like, as well as blends or mixtures thereof. Thus, an ethylene polymer encompasses polymers often referred to in the art as LLDPE (linear low density polyethylene) and HDPE (high density polyethylene). As an example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer can be categorized an as ethylene/1-hexene copolymer. The term "polymer" also includes all possible geometrical configurations, unless stated otherwise, and such configurations can include isotactic, syndiotactic, and random symmetries. Moreover, unless stated otherwise, the term "polymer" also is meant to include all molecular weight polymers, and is inclusive of lower molecular weight polymers.

The term "co-catalyst" is used generally herein to refer to compounds such as aluminoxane compounds, organoboron or organoborate compounds, ionizing ionic compounds, organoaluminum compounds, organozinc compounds, organomagnesium compounds, organolithium compounds, and the like, that can constitute one component of a catalyst composition. The term "co-catalyst" is used regardless of the actual function of the compound or any chemical mechanism by which the compound may operate.

The term "contact product" is used herein to describe compositions wherein the components are contacted together in any order, in any manner, and for any length of time, unless otherwise specified. For example, the components can be contacted by blending or mixing. Further, contacting of any component can occur in the presence or absence of any other component of the compositions described herein. Combining additional materials or components can be done by any suitable method. Further, the term "contact product" includes mixtures, blends, solutions, slurries, reaction products, and the like, or combinations thereof. Although "contact product" can include reaction products, it is not required for the respective components to react with one another. Similarly, the term "contacting" is used herein to refer to materials which can be blended, mixed, slurried, dissolved, reacted, treated, or otherwise combined in some other manner.

Although any methods, devices, and materials similar or equivalent to those described herein can be used in the practice or testing of the invention, the typical methods, devices, and materials are herein described.

All publications and patents mentioned herein are incorporated herein by reference in their entirety for the purpose of describing and disclosing, for example, the constructs and methodologies that are described in the publications and patents, which might be used in connection with the presently described invention.

Several types of ranges are disclosed in the present invention. When a range of any type is disclosed or claimed, the intent is to disclose or claim individually each possible number that such a range could reasonably encompass, including end points of the range as well as any sub-ranges and combinations of sub-ranges encompassed therein. For example, the particle size span of the solid oxide (or the catalyst) can be in various ranges. By a disclosure that the particle size span can range from 0.5 to 1.4, the intent is to recite that the span can be any amount within the range and, for example, can include any range or combination of ranges from 0.5 to 1.4, such as from 0.6 to 1.4, from 0.7 to 1.4, from 0.6 to 1.35, from 0.7 to 1.35, from 0.8 to 1.35, from 0.7 to 1.1, or from 0.8 to 1.1, and so forth. Likewise, all other ranges disclosed herein should be interpreted in a manner similar to this example.

In general, an amount, size, formulation, parameter, range, or other quantity or characteristic is "about" or "approximate" whether or not expressly stated to be such. Whether or not modified by the term "about" or "approximately," the claims include equivalents to the quantities or characteristics.

DETAILED DESCRIPTION OF THE INVENTION

The present invention is directed generally to supported chromium catalysts, controlling the particle size of the solid oxide used in these chromium catalysts, methods for using the chromium catalysts to polymerize olefins in fluidized bed reactors, the polymer resins produced using such catalysts, and films and other articles of manufacture produced from these polymer resins.

Ordinarily during ethylene polymerization with chromium catalysts, catalyst particles are introduced into a reactor, where they then cause ethylene to polymerize into solid hard polyethylene. Catalyst pores quickly fill up with polymer and then the catalyst matrix begins to "explode" the catalyst particle. That is, during polymerization the hydraulic pressure generated from growing polymer destroys the catalyst particle, disintegrating it into billions of tiny fragments that stay in the polymer. However, their presence is typically of no concern because of the extremely small size of these particle fragments, which are much smaller than the die in a film or extrusion line, for example.

However, because commercial polymerization is conducted in a continuous process, catalyst is always being fed continuously into, and also taken continuously out of, the reactor. Thus, catalyst particles do not have a uniform residence time in the reactor. Some stay in the reactor for hours, whereas others exit by chance quickly after they are charged to the reactor—this is called "short-circuiting" of the catalyst particles. Such short-lived catalyst particles do not have time to react with the ethylene and therefore they do not disintegrate into tiny fragments. Instead, they often exit the reactor intact, as large hard catalyst particles that then cause problems downstream, such as catalyst particle "gels." The term "gels" is a generic term describing film imperfections from various sources. When the catalyst is a silyl chromate (e.g., on a solid oxide support), these "gels" are usually unfragmented catalyst particles.

These ~100-400+ μm short-circuited catalyst particles are considerably larger than the typical thickness of many film products, which often range from less than 12 up to 75 μm in film thickness. Usually called a gel, these unfragmented catalyst particles cause imperfections in the film, imparting surface roughness, interfering with clarity and other optical properties, leading to printing defects and stress points for failure of the film product (or other article of manufacture). Thus, it is important to minimize the presence of these "short-circuited" catalyst gels.

During HDPE and LLDPE manufacture, automatic laser-light gel counters are used to determine and track gels in batches of polymer resin as they are made in real-time, so that corrections for high gels can be quickly made by adjusting polymerization reaction conditions. Film made from the polymer is passed through an optical camera of a gel analyzer to provide instant quantification of the gel level. Many polymer resins have gel specifications, such as, for example, a maximum allowed level of no more than 150 gels/ft$^2$ of 25 micron thick film.

Typically, to qualify as a "gel" the optical imperfection recognized by the camera and computer on the gel analyzer must register the gel size as greater than 200 μm in diameter. From experience, we have concluded that catalyst particles of 100+ μm diameter register as 200+ μm gels, due to the polymer sometimes clinging to the catalyst particle, thus adding to its size, and also because of the "lens effect." The latter is an optical magnification of the catalyst particle's size due to the formation of a convex lens made of clear polymer that surrounds the catalyst particle. For this reason, as discussed herein, this invention is mainly focused on minimizing defects (or gels) due to catalyst particles of 100 μm or more.

Catalyst particle sizes that perform well in certain loop slurry processes are often not transferable to fluidized bed gas phase processes, due in part to differences in chromium content of the catalyst, in catalyst loading/feeding, and in downstream polymer transfer, as well as particle settling efficiency in a gaseous medium versus a liquid diluent. For fluidized bed gas phase processes, the benefits of smaller catalyst particle sizes generally include lower gels, more surface area which increases the potential for collisions and mass transfer, greater potential reactor mass solids, longer reactor residence times, higher activities, and more efficient purge capability. However, there are significant drawbacks to the use of small particle sizes (fines), in particular, difficulties with activation and transfer of the solid oxide/supported catalyst into the reactor and issues of downstream powder/fluff transfer (since smaller catalyst particles generally make smaller polymer particles. An objective of this invention, therefore, is to target a moderate average catalyst particle size and with a narrow particle size distribution, such that the only a small amount of catalyst particles are fines (e.g., less than 10 microns), while also minimizing the amount of very large catalyst particles (e.g., greater than 100 microns), which also can be problematic, as discussed further herein.

The supported chromium catalyst contains a solid oxide and a suitable amount of chromium impregnated therein. The solid oxide (and the supported chromium catalyst) would have the described particle size distribution. This is distinct from Ziegler-Natta and metallocene-based catalyst systems.

The gels that are of concern in the herein disclosed chromium-based polymers—and any articles or products produced from these chromium-based polymers—are catalyst particle gels (hard gels) that arise from the supported catalyst particle. While not wishing to be bound by theory, it is believed that many of the catalyst particle gels resulting from chromium-based polymers are due to relatively large catalyst particles which result in optical defects in product and articles (such as films) produced from the polymers. It was found that the particle size of the solid oxide (and thus, the particle size of the supported chromium catalyst) can dramatically impact the number of polymer defects resulting from catalyst particles. However, the number of defects (catalyst particle gels) also is impacted by the catalyst productivity and the amount of catalyst particles that are not disintegrated during polymerization into catalyst fines in the resulting polymer, among other factors.

Further, in addition to gels, the particle size distribution also can significantly impact polymer properties, such as polymer molecular weight distribution, density, and rheological properties. For instance, it was found that broader particle size distributions can result in greater polymer heterogeneity.

By controlling the particle size distribution of the solid oxide (and the supported chromium catalyst), more consistent polymer particle sizes (in powder or fluff form) can be produced, thereby resulting in more homogeneous ethylene polymers with the reduction—or even elimination—of gel defects of a certain size that result from catalyst particles.

Supported Chromium (VI) Catalysts

Disclosed herein are supported chromium (VI) catalysts. In one aspect, the catalyst can comprise a solid oxide, from 0.05 to 5 wt. % chromium, and from 0.2 to 20 wt. % carbon. In this aspect, the solid oxide (or the catalyst) can have an amount of the solid oxide (or the catalyst) with a particle size greater than 100 μm of less than or equal to 3 wt. % and a particle size span ((d90−d10)/d50) in a range from 0.5 to 1.4. In another aspect, the catalyst can comprise a solid oxide, from 0.05 to 5 wt. % chromium, and from 0.2 to 20 wt. % carbon. In this aspect, the solid oxide (or the catalyst) can have an amount of the solid oxide (or the catalyst) with a particle size greater than 100 μm of less than or equal to 0.5 wt. % and an amount of the solid oxide (or the catalyst) with a particle size less than 10 μm of less than or equal to 10 wt. %. In yet another aspect, the catalyst can comprise a solid oxide and from 0.05 to 5 wt. % chromium, wherein the chromium has at least one triphenylsilyl ligand (attached to the chromium). In this aspect, the solid oxide (or the catalyst) can have an amount of the solid oxide (or the catalyst) with a particle size greater than 100 μm of less than or equal to 3 wt. % and a particle size span ((d90−d10)/d50) in a range from 0.5 to 1.4. In still another aspect, the catalyst can comprise a solid oxide and from 0.05 to 5 wt. % chromium, wherein the chromium has at least one triphenylsilyl ligand. In this aspect, the solid oxide (or the catalyst)

can have an amount of the solid oxide (or the catalyst) with a particle size greater than 100 μm of less than or equal to 0.5 wt. % and an amount of the solid oxide (or the catalyst) with a particle size less than 10 μm of less than or equal to 10 wt. %. Supported chromium (VI) catalysts consistent with the present invention also can have any of the catalyst properties or attributes listed below and in any combination, unless indicated otherwise.

The amount of chromium in the catalyst disclosed herein is not particularly limited, but generally falls in a range from 0.05 to 5 wt. %. More often, the chromium content can be in a range from 0.05 to 1 wt. %; alternatively, from 0.1 to 1.5 wt. %; alternatively, from 0.1 to 0.75 wt. %; alternatively, from 0.1 to 0.4 wt. %; alternatively, from 0.2 to 2 wt. %; alternatively, from 0.2 to 0.75 wt. %; or alternatively, from 0.2 to 0.3 wt. % chromium. These weight percentages are based on the amount of chromium relative to the total weight of the supported chromium catalyst. Chromium loadings of less than 1 wt. % can be used in fluidized bed reactors due to lower heat transfer capability (e.g., as compared to slurry processes) and longer reactor residence times.

For the disclosed supported chromium (VI) catalysts, at least 60 wt. % of the chromium can be present in an oxidation state of six (Cr+6). In further aspects, at least 75 wt. %, at least 85 wt. %, or at least 95 wt. %, of the chromium can be present in an oxidation state of six (Cr+6).

Generally, the total pore volume (total pore volume via nitrogen sorption) of the solid oxide (or the supported catalyst) falls within a range from 0.5 to 5 mL/g, but is not limited thereto. Illustrative and non-limiting ranges for the total pore volume include from 1 to 5 mL/g, from 1 to 4 mL/g, from 1 to 3 mL/g, from 1.2 to 4.5 mL/g, from 1.2 to 2.5 mL/g, or from 1.3 to 1.8 mL/g.

The total BET surface area of the solid oxide (or the catalyst) is not limited to any particular range, but typically falls within a range from 200 to 700 $m^2/g$. Illustrative and non-limiting ranges for the total BET surface area include from 200 to 500 $m^2/g$, from 250 to 650 $m^2/g$, from 250 to 550 $m^2/g$, from 250 to 400 $m^2/g$, from 275 to 525 $m^2/g$, or from 400 to 600 $m^2/g$.

In particular aspects of this invention, the supported chromium (VI) catalyst can contain from 0.2 to 20 wt. % carbon, from 0.2 to 6 wt. % carbon, or from 0.2 to 3 wt. % carbon, and in further aspects, from 0.5 to 8 wt. % carbon, from 0.5 to 2 wt. % carbon, or from 0.5 to 1 wt. % carbon. These weight percentages are based on the amount of carbon relative to the total weight of the supported chromium (VI) catalyst.

The solid oxide can encompass oxide materials such as silica, "mixed oxide" compounds thereof such as silica-titania, and combinations or mixtures of more than one solid oxide material. Mixed oxides such as silica-titania can be single or multiple chemical phases with more than one metal combined with oxygen to form the solid oxide. Examples of mixed oxides that can be used as solid oxide include, but are not limited to, silica-alumina, silica-coated alumina, silica-titania, silica-zirconia, alumina-titania, alumina-zirconia, zinc-aluminate, alumina-boria, silica-boria, aluminum phosphate, aluminophosphate, aluminophosphate-silica, titania-zirconia, and the like, or a combination thereof. In some aspects, the solid oxide support can comprise silica, silica-alumina, silica-coated alumina, silica-titania, silica-titania-magnesia, silica-zirconia, silica-magnesia, silica-boria, aluminophosphate-silica, and the like, or any combination thereof. Silica-coated aluminas are encompassed herein; such oxide materials are described in, for example, U.S. Pat. Nos. 7,884,163 and 9,023,959.

The percentage of each oxide in a mixed oxide can vary depending upon the respective oxide materials. As an example, a silica-alumina (or silica-coated alumina) typically has an alumina content from 5 wt. % to 95 wt. %. According to one aspect, the alumina content of the silica-alumina (or silica-coated alumina) can be from 5 wt. % alumina 50 wt. % alumina, or from 8 wt. % to 30 wt. % alumina. In another aspect, high alumina content silica-aluminas (or silica-coated aluminas) can be employed, in which the alumina content of these materials typically ranges from 60 wt. % alumina to 90 wt. % alumina, or from 65 wt. % alumina to 80 wt. % alumina.

In one aspect, the solid oxide can comprise silica-alumina, silica-coated alumina, silica-titania, silica-zirconia, alumina-titania, alumina-zirconia, zinc-aluminate, alumina-boria, silica-boria, aluminum phosphate, aluminophosphate, aluminophosphate-silica, titania-zirconia, or a combination thereof; alternatively, silica-alumina; alternatively, silica-coated alumina; alternatively, silica-titania; alternatively, silica-zirconia; alternatively, alumina-titania; alternatively, alumina-zirconia; alternatively, zinc-aluminate; alternatively, alumina-boria; alternatively, silica-boria; alternatively, aluminum phosphate; alternatively, aluminophosphate; alternatively, aluminophosphate-silica; or alternatively, titania-zirconia.

In another aspect, the solid oxide can comprise silica, alumina, titania, thoria, stania, zirconia, magnesia, boria, zinc oxide, a mixed oxide thereof, or any mixture thereof. In yet another aspect, the solid oxide can comprise silica, silica-alumina, silica-coated alumina, silica-titania, silica-titania-magnesia, silica-zirconia, silica-magnesia, silica-boria, aluminophosphate-silica, or any combination thereof; alternatively, silica; or alternatively, silica-titania. In still another aspect, the solid oxide can comprise silica, alumina, silica-alumina, silica-coated alumina, aluminum phosphate, aluminophosphate, heteropolytungstate, titania, zirconia, magnesia, boria, zinc oxide, silica-titania, silica-yttria, silica-zirconia, alumina-titania, alumina-zirconia, zinc-aluminate, alumina-boria, silica-boria, aluminophosphate-silica, titania-zirconia, and the like, or any combination thereof.

Optionally, any of the solid oxides disclosed herein can be chemically-treated, such as with a source of fluoride, chloride, sulfate, and the like, as well as combinations thereof. Thus, fluorided solid oxides, chlorided solid oxides, sulfated solid oxides, etc., are encompassed.

Herein, the solid oxide (or the catalyst) can be characterized by an amount of the solid oxide (or the catalyst) with a particle size greater than 100 μm of less than or equal to 3 wt. % and a particle size span ((d90−d10)/d50) in a range from 0.5 to 1.4, and/or the solid oxide (or the catalyst) can be characterized by an amount of the solid oxide (or the supported chromium catalyst) with a particle size greater than 100 μm of less than or equal to 0.5 wt. % and an amount of the solid oxide (or the supported chromium catalyst) with a particle size less than 10 μm of less than or equal to 10 wt. %. The solid oxide (or the catalyst) also can have any of the particle attributes listed below and in any combination, unless indicated otherwise.

As described herein, a very small amount of the solid oxide (or the catalyst) has a particle size of less than 10 μm. In one aspect, the amount is less than or equal to 10 wt. % (or 7 wt. %), while in another aspect, the amount is less than or equal to 5 wt. % (or 4 wt. %), and in yet another aspect, the amount is less than or equal to 3 wt. % (or 2 wt. %). Likewise, a very small amount of the solid oxide (or the catalyst) has a particle size of greater than 100 μm. In one aspect, the amount is less than or equal to 2 wt. % (or 1 wt. %), while in another aspect, the amount is less than or equal to 0.5 wt. % (or 0.35 wt. %), and in yet another aspect, the amount is less than or equal to 0.2 wt. % (or 0.1 wt. %).

Similarly, the amount of the solid oxide (or the catalyst) with a particle size less than 15 μm and greater than 75 μm is relatively small. For instance, the amount of the solid oxide (or the catalyst) with a particle size less than 15 μm is generally less than or equal to 20 wt. %, such as less than or equal to 18 wt. %, less than or equal to 15 wt. %, less than or equal to 13 wt. %, or less than or equal to 8 wt. %. The amount of the solid oxide (or the catalyst) with a particle size greater than 75 μm is generally less than or equal to 10 wt. %, such as less than or equal to 6.5 wt. %, less than or equal to 4 wt. %, less than or equal to 2.5 wt. %, less than or equal to 1.5 wt. %, or less than or equal to 1 wt. %.

Stated another way, the number of the solid oxide (or the catalyst) particles with a particle size greater than 150 μm generally is less than or equal to 10,000, such as less than or equal to 1000, less than or equal to 100, or less than or equal to 50, per gram of the solid oxide (or the catalyst). Additionally or alternatively, the number of the solid oxide (or the catalyst) particles with a particle size greater than 100 μm is generally less than or equal to 100,000, such as less than or equal to 10,000, less than or equal to 1000, less than or equal to 100, or less than or equal to 50, per gram of the solid oxide (or the catalyst). Additionally or alternatively, the number of the solid oxide (or the catalyst) particles with a particle size greater than 75 μm is generally less than or equal to 100,000, less than or equal to 50,000, less than or equal to 10,000, less than or equal to 1000, or less than or equal to 100, per gram of the solid oxide (or the catalyst).

In one aspect, the d50 average particle size of the solid oxide (or the catalyst) can be in a range from 15 to 60 μm, while in another aspect, the d50 particle size can range from 15 to 50 μm, and in another aspect, the d50 particle size can range from 15 to 40 μm, and in yet another aspect, the d50 particle size can range from 17 to 45 μm, and in still another aspect, the d50 particle size can range from 17 to 32 μm. The particle size span ((d90−d10)/d50) can fall within a range from 0.5 to 1.4, from 0.6 to 1.4, from 0.7 to 1.4, from 0.6 to 1.35, from 0.7 to 1.35, from 0.8 to 1.35, from 0.7 to 1.1, or from 0.8 to 1.1, although not limited thereto.

The solid oxide (or the catalyst) can have a d10 particle size of greater than or equal to 10 μm; alternatively, greater than or equal to 11 μm; alternatively, in a range from 10 to 25 μm; alternatively, in a range from 10 to 20 μm; or alternatively, in a range from 11 to 22 μm. Additionally or alternatively, the solid oxide (or the catalyst) can have a d95 particle size ranging from 25 to 88 μm, from 28 to 85 μm, from 30 to 82 μm, from 25 to 65 μm, or from 30 to 55 μm. While not limited thereto, the solid oxide (or the catalyst) can be further characterized by the ratio of d80/d20, which often ranges from 1.3 to 2.8. In some aspects, the ratio of d80/d20 can range from 1.3 to 2.2, from 1.4 to 2.8, from 1.4 to 2.2, from 1.5 to 2.7, or from 1.5 to 2.1.

While not limited thereto, the support chromium catalyst generally can be prepared by first calcining a solid oxide (such as silica) and then impregnating the solid oxide with a chromium precursor (or chromium-containing compound), such as a silyl chromate, a non-limiting example of which is triphenylsilyl chromate. This catalyst is then treated (or reduced) with an organoaluminium compound (a non-limiting example of which is diethylaluminum ethoxide) at a molar ratio of aluminum to chromium of from 1:1 to 10:1, and more often, from 2:1 to 5:1 or from 2:1 to 3:1. After this treatment (or reduction), the catalyst is no longer chromium (VI).

A particular catalyst encompassed herein is based on bis(triphenylsilyl) chromate $\{(C_6H_5)_3SiO]_2CrO_2\}$ and can be prepared on a dehydrated or calcined (e.g., at 400-800° C.) solid oxide material of silica-alumina, silica-coated alumina, or silica. These catalysts ordinarily require the addition of an aluminum alkyl in the catalyst preparation step to achieve high activity. Beneficially, the bis(triphenyl-silyl) chromate catalyst deposited into silica does not require a high temperature activation (calcination) step in the catalyst preparation process. This catalyst is activated in the polymerization reactor by the ethylene, which results in an induction time before the onset of polymerization. However, because the bis(triphenylsilyl) chromate catalyst on silica utilizes an aluminum alkyl such as diethylaluminum ethoxide (DEALE), it is believed that the finished catalyst does not contain Cr(VI), but contains chromium in lower oxidation states, such as Cr(II), Cr(III), and/or Cr(IV).

In another method of contacting catalyst and co-catalyst, the catalyst is treated with concentrated co-catalyst (e.g., DEALE) in a batch process. The catalyst is then dried and fed to the reactor as a single powder. This approach is advantageous for a fluidized bed process, in which a solvent is not available and in which the co-catalyst does not have high volatility. Both Cr(VI) oxide and bis(triphenylsilyl) chromate catalysts can be used as the catalyst component, but typically the latter is used, and treated with diethylaluminum ethoxide.

In general, better flow and fluidization properties are obtained with spherical catalyst particles and catalyst attrition tends to be lessened compared to irregularly or non-spherically shaped particles. Additionally, smaller and more consistent spherical catalyst particles can improve reactor operability, with more relative surface area for collisions and mass transfer leading to higher activities and a more consistent reaction. In an aspect, the average sphericity of the catalyst (measured using microscopy) can be in the range from 0.5 to 1.0, and more often, in a range from 0.6 to 1 or from 0.7 to 1.0. Sphericity generally measures the degree to which a particle approaches a spherical shape, and it may be defined as the ratio between the diameter of a sphere with the same volume as the particle and the diameter of the circumscribed sphere. The sphericity of a particle is determined by measuring the three linear dimensions of the particle: longest diameter, intermediate diameter and shortest diameter. As the sphericity value of a particle approaches a value of 1.0, it approaches a more spherical shape. Sphericity of the catalyst is described in U.S. Pat. No. 10,787,526.

Often, the supported chromium catalyst has a relatively low wet particle density, due to the high porosity of the catalyst (solid oxide), and thus the wet particle density can be significantly different from the skeletal density of the catalyst (with no porosity). The wet particle density is the particle density in water and is determined by the following equation: wet particle density=(1+PV)/(PV+1/skeletal density), where PV is the pore volume of the supported chromium catalyst. The wet particle density of the supported chromium catalyst can range from 1.05 to 2.0 g/cc in one aspect, from 1.05 to 1.5 g/cc or from 1.2 to 2.0 g/cc in another aspect, from 1.2 to 1.8 g/cc or from 1.2 to 1.6 g/cc in another aspect, from 1.3 to 1.9 g/cc or from 1.3 to 1.7 g/cc in yet another aspect, and from 1.3 to 1.5 g/cc in still another aspect.

Polymerization Processes

Olefin polymers (e.g., ethylene polymers) can be produced from the disclosed supported chromium (VI) catalysts using any suitable polymerization process using various types of polymerization reactors, polymerization reactor systems, and polymerization reaction conditions. A representative polymerization process can comprise contacting the catalyst (any supported chromium (VI) catalyst disclosed herein) and an optional co-catalyst with an olefin monomer and an optional olefin comonomer in a polymerization reactor system under polymerization conditions to produce an olefin polymer. This invention also encompasses any olefin polymers (e.g., ethylene polymers) produced by the polymerization processes disclosed herein.

In the polymerization processes, optionally, a co-catalyst can be utilized with the supported chromium (VI) catalyst. In one aspect, the co-catalyst can comprise an aluminoxane compound, an organoaluminum compound, or an organoboron compound, and this includes combinations of more than co-catalyst compound. Representative and non-limiting examples of aluminoxanes include methylaluminoxane, modified methylaluminoxane, ethylaluminoxane, n-propyl-aluminoxane, iso-propyl-aluminoxane, n-butylaluminoxane, t-butylaluminoxane, sec-butylaluminoxane, iso-butylaluminoxane, 1-pentylaluminoxane, 2-pentylaluminoxane, 3-pentylaluminoxane, isopentylaluminoxane, neopentylaluminoxane, and the like, or any combination thereof. Representative and non-limiting examples of organoaluminums include trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, and the like, or any combination thereof. Representative and non-limiting examples of organoborons include tri-n-butyl borane, tripropylborane, triethylborane, and the like, or any combination thereof. Co-catalysts that can be used are not limited to the co-catalysts described above. Other suitable co-catalysts (such as organomagnesiums and organolithiums) are well known to those of skill in the art including, for example, those disclosed in U.S. Pat. Nos. 3,242,099, 4,794,096, 4,808,561, 5,576,259, 5,807,938, 5,919,983, 7,294,599 7,601,665, 7,884,163, 8,114,946, and 8,309,485.

As used herein, a "polymerization reactor" includes any polymerization reactor capable of polymerizing olefin monomers and comonomers (one or more than one comonomer) to produce homopolymers, copolymers, terpolymers, and the like. The various types of polymerization reactors include those that can be referred to as a batch reactor, slurry reactor, gas-phase reactor, solution reactor, high pressure reactor, tubular reactor, autoclave reactor, and the like, or combinations thereof; or alternatively, the polymerization reactor system can comprise a slurry reactor, a gas-phase reactor, a solution reactor, a multizone circulating reactor, or a combination thereof. The polymerization conditions for the various reactor types are well known to those of skill in the art. Gas phase reactors can comprise fluidized bed reactors or staged horizontal reactors. Slurry reactors can comprise vertical or horizontal loops. High pressure reactors can comprise autoclave or tubular reactors. Reactor types can include batch or continuous processes. Continuous processes can use intermittent or continuous product discharge. Polymerization reactor systems and processes also can include partial or full direct recycle of unreacted monomer, unreacted comonomer, and/or diluent.

A polymerization reactor system can comprise a single reactor or multiple reactors (2 reactors, more than 2 reactors) of the same or different type. For instance, the polymerization reactor system can comprise a slurry reactor, a gas-phase reactor, a solution reactor, or a combination of two or more of these reactors. Production of polymers in multiple reactors can include several stages in at least two separate polymerization reactors interconnected by a transfer device making it possible to transfer the polymer resulting from the first polymerization reactor into the second reactor. The desired polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop and/or gas phase reactors. The multiple reactors can be operated in series, in parallel, or both. Accordingly, the present invention encompasses polymerization reactor systems comprising a single reactor, comprising two reactors, and comprising more than two reactors. The polymerization reactor system can comprise a slurry reactor, a gas-phase reactor, a solution reactor, in certain aspects of this invention, as well as multi-reactor combinations thereof.

According to one aspect, the polymerization reactor system can comprise at least one loop slurry reactor comprising vertical or horizontal loops. Monomer, diluent, catalyst, and comonomer can be continuously fed to a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, 6,833,415, and 8,822,608. Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used.

According to yet another aspect, the polymerization reactor system can comprise at least one gas phase reactor (e.g., a fluidized bed reactor). Such reactor systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. Representative gas phase reactors are disclosed in U.S. Pat. Nos. 5,352,749, 4,588,790, 5,436,304, 7,531,606, and 7,598,327.

Due to the smaller catalyst particles disclosed herein, the linear velocity of the gas stream (fluidization velocity) in the fluidized bed reactor can be reduced, and often can range from 0.05 to 0.5 ft/sec or from 0.1 to 0.4 ft/sec. In one aspect, for instance, the linear velocity of the gas stream can range from 0.05 to 0.35 ft/sec, from 0.1 to 0.35 ft/sec, or from 0.15 to 0.35 ft/sec. In another aspect, the linear velocity can range from 0.05 to 0.25 ft/sec, from 0.1 to 0.25 ft/sec, from 0.15 to 0.25 ft/sec, or from 0.2 to 0.25 ft/sec. In yet another aspect, the linear velocity can range from 0.05 to 0.2 ft/sec, from 0.1 to 0.2 ft/sec, or from 0.15 to 0.2 ft/sec. In still another aspect, the linear velocity can range from 0.05 to 0.15 ft/sec, from 0.08 to 0.15 ft/sec, or from 0.1 to 0.15 ft/sec.

According to still another aspect, the polymerization reactor system can comprise a high pressure polymerization reactor, e.g., can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately to obtain optimal polymerization reaction conditions.

According to yet another aspect, the polymerization reactor system can comprise a solution polymerization reactor wherein the monomer/comonomer are contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone can be maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

The polymerization reactor system can further comprise any combination of at least one raw material feed system, at least one feed system for catalyst or catalyst components, and/or at least one polymer recovery system. Suitable reactor systems can further comprise systems for feedstock purification, catalyst storage and preparation, extrusion, reactor cooling, polymer recovery, fractionation, recycle, storage, loadout, laboratory analysis, and process control. Depending upon the desired properties of the olefin polymer, hydrogen can be added to the polymerization reactor as needed (e.g., continuously or pulsed).

Polymerization conditions that can be controlled for efficiency and to provide desired polymer properties can include temperature, pressure, and the concentrations of various reactants. Polymerization temperature can affect catalyst productivity, polymer molecular weight, and molecular weight distribution. Various polymerization conditions can be held substantially constant (such as within +/−20%, +/−10%, or +/−5%), for example, for the production of a particular grade of the olefin polymer (or ethylene polymer). A suitable polymerization temperature can be any temperature below the de-polymerization temperature according to the Gibbs Free energy equation. Typically, this includes from 60° C. to 280° C., for example, or from 60° C. to 120° C., depending upon the type of polymerization reactor(s). In some reactor systems, the polymerization temperature generally can be within a range from 70° C. to 105° C., or from 75° C. to 100° C.

Suitable pressures will also vary according to the reactor and polymerization type. The pressure for liquid phase polymerizations in a loop reactor is typically less than 1000 psig (6.9 MPa). Pressure for gas phase polymerization is usually at 200 to 500 psig (1.4 MPa to 3.4 MPa). High pressure polymerization in tubular or autoclave reactors is generally run at 20,000 to 75,000 psig (138 to 517 MPa). Polymerization reactors can also be operated in a supercritical region occurring at generally higher temperatures and pressures. Operation above the critical point of a pressure/temperature diagram (supercritical phase) can offer advantages to the polymerization reaction process.

Olefin monomers that can be employed with the supported chromium (VI) catalysts and in the polymerization processes of this invention typically can include olefin compounds having from 2 to 30 carbon atoms per molecule and having at least one olefinic double bond, such as ethylene or propylene. In an aspect, the olefin monomer can comprise a $C_2$-$C_{20}$ olefin; alternatively, a $C_2$-$C_{20}$ alpha-olefin; alternatively, a $C_2$-$C_{10}$ olefin; alternatively, a $C_2$-$C_{10}$ alpha-olefin; alternatively, the olefin monomer can comprise ethylene; or alternatively, the olefin monomer can comprise propylene (e.g., to produce a polypropylene homopolymer or a propylene-based copolymer).

When a copolymer (or alternatively, a terpolymer) is desired, the olefin monomer and the olefin comonomer independently can comprise, for example, a $C_2$-$C_{20}$ alpha-olefin. In some aspects, the olefin monomer can comprise ethylene or propylene, which is copolymerized with at least one comonomer (e.g., a $C_2$-$C_{20}$ alpha-olefin or a $C_3$-$C_{20}$ alpha-olefin). According to one aspect of this invention, the olefin monomer used in the polymerization process can comprise ethylene. In this aspect, the comonomer can comprise a $C_3$-$C_{10}$ alpha-olefin; alternatively, the comonomer can comprise 1-butene, 1-pentene, 1-hexene, 1-octene, 1-decene, styrene, or any combination thereof; alternatively, the comonomer can comprise 1-butene, 1-hexene, 1-octene, or any combination thereof; alternatively, the comonomer can comprise 1-butene; alternatively, the comonomer can comprise 1-hexene; or alternatively, the comonomer can comprise 1-octene.

Ethylene and Olefin Polymers

This invention is also directed to, and encompasses, the olefin polymers produced using any of the chromium catalysts and polymerization processes disclosed herein. Olefin polymers encompassed herein can include any polymer produced from any olefin monomer and optional comonomer(s) described herein. For example, the olefin polymer can comprise an ethylene homopolymer, an ethylene copolymer (e.g., ethylene/α-olefin, ethylene/1-butene, ethylene/1-hexene, ethylene/1-octene, etc.), a propylene homopolymer, a propylene copolymer, an ethylene terpolymer, a propylene terpolymer, and the like, including any combinations thereof. In one aspect, the olefin polymer can comprise an ethylene homopolymer, an ethylene/1-butene copolymer, an ethylene/1-hexene copolymer, and/or an ethylene/1-octene copolymer, while in another aspect, the olefin polymer can comprise an ethylene/1-hexene copolymer.

If the resultant polymer produced in accordance with the present invention is, for example, an ethylene polymer, its properties can be characterized by various analytical techniques known and used in the polyolefin industry. Articles of manufacture can be formed from, and/or can comprise, the olefin polymers (e.g., ethylene polymers) of this invention, whose typical properties are provided below.

As described herein, the particular size distribution of the solid oxide (and thus, the particle size distribution of the supported chromium (VI) catalyst) significantly impacts the amount of catalyst particle defects, and the amount of defects also depends on other factors like catalyst productivity, catalyst induction time, reactor residence time, and the presence of poisons. Moreover, it was also found that most of the small particle size polymer (fines) produced are not necessarily due to small catalyst particles, but instead, are largely the result of breakage of large particles into smaller particles (fines) in the reactor.

Therefore, an illustrative and non-limiting example of an ethylene polymer (e.g., an ethylene/α-olefin copolymer)—produced using the supported chromium (VI) catalysts with the particle size attributes and other properties disclosed herein—can have a high load melt index (HLMI) in a range from 4 to 70 g/10 min, a density in a range from 0.93 to 0.96 g/cm$^3$, and a film gel count of less than or equal to 15 catalyst particle gels per ft$^2$ of 25 micron thick film (or less than or equal to 12, or less than or equal to 10, or less than or equal to 8, or less than or equal to 5, or less than or equal to 2, gels per ft$^2$ of 25 micron thick film), where film gels encompass a size (diameter) greater than 200 μm and are caused by catalyst particles, and wherein the ethylene polymer contains a total (both disintegrated and non-fragmented) of from 150 to 680 ppm solid oxide (e.g., silica) and from 0.5 to 3 ppm chromium.

Another illustrative and non-limiting example of an ethylene polymer (e.g., an ethylene/α-olefin copolymer) can have a high load melt index (HLMI) in a range from 4 to 70 g/10 min, a density in a range from 0.93 to 0.96 g/cm$^3$, and a gel count of less than or equal to 50 catalyst particles of greater than 100 μm (in diameter) per 5 grams of the ethylene polymer (or less than or equal to 40, or less than or equal to 30, or less than or equal to 20, or less than or equal to 10, or less than or equal to 5, or less than or equal to 2, or less than or equal to 1, catalyst particle(s) per 5 grams of the ethylene polymer), and wherein the ethylene polymer contains from 150 to 680 ppm solid oxide (e.g., silica) and from 0.5 to 3 ppm chromium.

Further, these illustrative and non-limiting examples of ethylene polymers (which are typically in the form of pellets or beads) consistent with the present invention also can have any of the polymer properties listed below and in any combination, unless indicated otherwise.

The density of the ethylene-based polymers often can range from 0.93 to 0.96 or from 0.93 to 0.956 g/cm$^3$. In one aspect, the density can range from 0.934 to 0.96, from 0.934 to 0.956 in another aspect, from 0.934 to 0.95 in yet another aspect, or from 0.945 to 0.958 g/cm$^3$ in still another aspect.

The ethylene polymers can have a variety of melt flow properties, such as indicated by the high load melt index (HLMI) in a range from 4 to 70 g/10 min. In some aspects, the HLMI of the ethylene polymer can fall within a range from 4 to 50 or from 6 to 36 g/10 min. In other aspects, the HLMI of the ethylene polymer can fall within a range from 6 to 15, from 20 to 40, or from 25 to 36 g/10 min.

In an aspect, the ethylene polymers can have a Mw in a range from 100,000 to 275,000, from 120,000 to 240,000, or from 130,000 to 220,000 g/mol. Additionally or alternatively, the ethylene polymers can have a ratio of Mw/Mn in a range from 3 to 25, from 4 to 20, or from 5 to 18.

In an aspect, the ethylene polymers can have a CY-a parameter of from 0.10 to 0.23, from 0.11 to 0.20, from 0.11 to 0.16, from 0.12 to 0.18, from 0.13 to 0.20, from 0.13 to 0.16, from 0.14 to 0.18, or from 0.18 to 0.22, and the like. Additionally or alternatively, the ethylene polymer can have a relaxation time (Tau(eta) or $\tau(\eta)$) in a range from 0.5 to 50, from 0.8 to 10, from 0.8 to 5, from 0.8 to 3, from 4 to 40, or from 5 to 30 sec. These rheological parameters are determined from viscosity data measured at 190° C. and using the Carreau-Yasuda (CY) empirical model described herein.

Moreover, the ethylene polymers can be produced with a supported chromium (VI) catalyst, as discussed herein. Ziegler-Natta and metallocene based catalyst systems are not required. Therefore, the ethylene polymers can contain no measurable amount of zirconium or hafnium or titanium or vanadium or magnesium (catalyst residue), i.e., less than 0.1 ppm by weight. In some aspects, the ethylene polymers can contain, independently, less than 0.08 ppm, less than 0.05 ppm, or less than 0.03 ppm, of zirconium (or hafnium, or titanium, or vanadium, or magnesium). The amounts of these elements can be determined by ICP analysis on a PerkinElmer Optima 8300 instrument. Polymer or article samples can be ashed in a Thermolyne furnace with sulfuric acid overnight, followed by acid digestion in a HotBlock with HCl and HNO3 (3:1 v:v).

Instead, the ethylene polymers typically contain from 0.5 to 3 ppm chromium and from 150 to 680 ppm solid oxide, such as silica (by weight). Other illustrative ranges for the chromium content of these ethylene polymers include, but are not limited to, from 0.5 to 2.5 ppm, from 0.5 to 2 ppm, from 0.75 to 3 ppm, or from 1 to 2 ppm of chromium. Other illustrative ranges for the solid oxide content of these ethylene polymers include, but are not limited to, from 180 to 600 ppm, from 200 to 680 ppm, from 200 to 600 ppm, from 200 to 500 ppm, from 150 to 600 ppm, from 150 to 550 ppm, or from 150 to 500 ppm of solid oxide. The solid oxide content—such as silica content—of the polymer is quantified by an ash test, discussed hereinbelow.

Articles and Products

Articles of manufacture can be formed from, and/or can comprise, the olefin polymers (e.g., ethylene polymers) of this invention and, accordingly, are encompassed herein. For example, articles which can comprise the polymers of this invention can include, but are not limited to, an agricultural film, an automobile part, a bottle, a container for chemicals, a drum, a fiber or fabric, a food packaging film or container, a food service article, a fuel tank, a geomembrane, a household container, a liner, a molded product, a medical device or material, an outdoor storage product (e.g., panels for walls of an outdoor shed), outdoor play equipment (e.g., kayaks, bases for basketball goals), a pipe, a sheet or tape, a toy, or a traffic barrier, and the like. Various processes can be employed to form these articles. Non-limiting examples of these processes include injection molding, blow molding, rotational molding, film extrusion, sheet extrusion, profile extrusion, thermoforming, and the like. Additionally, additives and modifiers often are added to these polymers in order to provide beneficial polymer processing or end-use product attributes. Such processes and materials are described in Modern Plastics Encyclopedia, Mid-November 1995 Issue, Vol. 72, No. 12; and *Film Extrusion Manual—Process, Materials, Properties*, TAPPI Press, 1992. In some aspects of this invention, an article of manufacture can comprise any of olefin polymers (or ethylene polymers)

described herein, and the article of manufacture can be or can comprise a film (e.g., a blown film), a pipe, or a blow molded product.

The products and articles of manufacture encompassed herein also can be characterized by very low levels of catalyst particle gels, typically having a gel count of less than or equal to 50 catalyst particles of greater than 100 μm (in diameter) per 5 grams of the product/article. For instance, the product/article can contain less than 25 catalyst particles of greater than 100 μm per 5 grams of the product/article, and in some cases, less than 10, or less than 5, or less than 2, or less than 1 catalyst particle (of greater than 100 μm) per 5 grams of the product/article.

EXAMPLES

The invention is further illustrated by the following examples, which are not to be construed in any way as imposing limitations to the scope of this invention. Various other aspects, embodiments, modifications, and equivalents thereof which, after reading the description herein, may suggest themselves to one of ordinary skill in the art without departing from the spirit of the present invention or the scope of the appended claims.

Melt index (MI, g/10 min) was determined in accordance with ASTM D1238 at 190° C. with a 2,160 gram weight, and high load melt index (HLMI, g/10 min) was determined in accordance with ASTM D1238 at 190° C. with a 21,600 gram weight. Density was determined in grams per cubic centimeter (g/cm³) on a compression molded sample, cooled at 15° C. per minute, and conditioned for 40 hours at room temperature in accordance with ASTM D1505 and ASTM D4703. In some cases, as noted, melt index and high load melt index were determined from viscosity data and the CY model, as described below.

Molecular weights and molecular weight distributions were obtained using a PL-GPC 220 (Polymer Labs, an Agilent Company) system equipped with a IR4 detector (Polymer Char, Spain) and three Styragel HMW-6E GPC columns (Waters, MA) running at 145° C. The flow rate of the mobile phase 1,2,4-trichlorobenzene (TCB) containing 0.5 g/L 2,6-di-t-butyl-4-methylphenol (BHT) was set at 1 mL/min, and polymer solution concentrations were in the range of 1.0-1.5 mg/mL, depending on the molecular weight. Sample preparation was conducted at 150° C. for nominally 4 hr with occasional and gentle agitation, before the solutions were transferred to sample vials for injection. An injection volume of 200 μL was used. The integral calibration method was used to deduce molecular weights and molecular weight distributions using a Chevron Phillips Chemical Company's HDPE polyethylene resin, MARLEX® BHB5003, as the broad standard. The integral table of the broad standard was pre-determined in a separate experiment with SEC-MALS. Mn is the number-average molecular weight, Mw is the weight-average molecular weight, Mz is the z-average molecular weight, Mv is viscosity-average molecular weight, and Mp is the peak molecular weight (location, in molecular weight, of the highest point of the molecular weight distribution curve).

Melt rheological characterizations were performed as follows. Small-strain (less than 10%) oscillatory shear measurements were performed on an Anton Paar MCR rheometer using parallel-plate geometry. All rheological tests were performed at 190° C. The complex viscosity $|\eta^*|$ versus frequency ($\omega$) data were then curve fitted using the modified three parameter Carreau-Yasuda (CY) empirical model to obtain the zero shear viscosity—$\eta_0$, characteristic viscous relaxation time—$\tau_\eta$, and the breadth parameter—a (CY-a parameter). The simplified Carreau-Yasuda (CY) empirical model is as follows.

$$|\eta*(\omega)| = \frac{\eta 0}{[1+(\tau_n\omega)^a]^{\frac{1-n}{a}}},$$

wherein: $|n*(\omega)|$=magnitude of complex shear viscosity;
$\eta_0$=zero shear viscosity;
$\tau_n$=viscous relaxation time (Tau($\eta$));
a="breadth" parameter (CY-a parameter);
n=fixes the final power law slope, fixed at 2/11; and
$\omega$=angular frequency of oscillatory shearing deformation.

Details of the significance and interpretation of the CY model and derived parameters can be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume 1, Fluid Mechanics*, 2nd Edition, John Wiley & Sons (1987).

BET surface areas can be determined using the BET nitrogen adsorption method of Brunauer et al., *J. Am. Chem. Soc.*, 60, 309 (1938) as described in ASTM D1993-91. Total pore volumes can be determined in accordance with Halsey, G. D., *J. Chem. Phys.* (1948), 16, pp. 931. Pore volume distributions can be obtained from DFT calculations (see Colloids and Surfaces A: Physicochemical and Engineering Aspects, Volume 437, 20 Nov. 2013, Pages 3-32).

Solid oxide particle size distributions were determined by using an aqueous suspension of the solid oxide (or the supported chromium catalyst) and a Microtrac S3500 laser particle size analyzer. Conditions were set to "opaque" with a run time of 30 sec, number of measurements 3, and shape spherical. As a skilled artisan would readily recognize, supporting the chromium on the solid oxide would not impact the particle size distribution, particularly given the low amount (loading) of chromium, thus the particle size distribution of the supported chromium catalyst would be effectively the same as the particle size distribution of the solid oxide. For the examples, the solid oxide was tested, while the supported chromium catalyst would have effectively the same test results.

Particle Size Distributions of Solid Oxides (or Supported Chromium Catalysts)

Inventive catalyst 1 was prepared using a silica-coated alumina containing 40 wt. % silica and 60 wt. % alumina, and with a surface area of 450 m²/g, a pore volume of 1.2 mL/g, and a d50 average particle size (diameter) of 19.3 μm. Chromium triacetate, 1.25 g, was dissolved into 50 mL of deionized water. This solution was then added to 30 g of the silica-coated alumina powder and stirred to incipient wetness to make a wet-sand consistency. The powder was then dried overnight in a vacuum oven set at 110° C. To calcine the catalyst, about 10 g were placed in a 1.75 inch quartz tube fitted with a sintered quartz disk at the bottom. While the catalyst was supported on the disk, dry air was blown up through the disk at a linear rate of 1.6-1.8 standard cubic feet per hour. An electric furnace around the quartz tube was then turned on and the temperature was raised at the rate of 400° C./hr to a temperature of 780° C., then maintained at that temperature and fluidized for 3 hr in dry air. Afterward, the catalyst was collected and stored under dry nitrogen without exposure to the atmosphere.

Inventive catalyst 2 was prepared from a silica having a surface area of 300 m²/g, a pore volume of 1.6 mL/g, and a d50 average particle size of 26.2 μm. Chromium triacetate, 30 g, was dissolved into 2 L of deionized water. This solution was then added to 650 g of the silica powder and stirred to incipient wetness to make a wet-sand consistency. The powder was then dried overnight in a vacuum oven set at 110° C. To calcine Inventive catalyst 2, a similar procedure was used as that described above, only in a larger calciner, in order to produce larger quantities of catalyst for a 23-gallon loop reactor pilot plant. First, 1.5 pounds of the catalyst was charged to a 6-inch diameter stainless steel furnace which was also heated by electric heating coils surrounding it. Dry air rose up through a sintered metal grid plate at the rate of 0.12-0.20 linear feet per second to fluidize the catalyst. The catalyst was heated up to the desired temperature, 780° C., over a period of 5 hr. It was then held at that temperature for another 6 hr, then cooled down to room temperature and stored under dry nitrogen until being used.

Inventive catalyst 3 was prepared from a silica having a surface area of 300 m²/g, a pore volume of 1.6 mL/g, and a d50 average particle size of 40.5 μm. Inventive catalyst 3 was prepared and calcined similarly to that of Inventive catalyst 2.

Inventive catalyst 4 was prepared from a silica-coated alumina containing 40 wt. % silica and 60 wt. % alumina, and with a surface area of 450 m²/g and a pore volume of 1.2 mL/g. The silica-coated alumina was passed through a 270 Tyler mesh sieve. That which remained on the screen was removed, whereas that which passed through the screen was captured for use. Thus, the Inventive catalyst 4 support had a d50 average particle size of 28.2 μm. Chromium triacetate, 1.25 g, was dissolved into 50 mL of deionized water. This solution was then added to 30 g of the above support powder and stirred to incipient wetness to make a wet-sand consistency. The powder was the dried overnight in a vacuum oven set at 110° C. Inventive catalyst 4 was calcined using the same procedure as for Inventive catalyst 1.

Although Inventive catalysts 1-4 were not silyl chromate catalysts, the silica and silica-coated alumina supports of Inventive catalysts 1-4 could have been calcined and then impregnated with any suitable amount of bis(triphenylsilyl) chromate to form a supported silyl chromate catalyst as described herein, with any desirable amount of chromium (e.g., 0.1 to 0.4 wt. %). As a skilled artisan would readily recognize, the particle size distributions of the analogous silyl chromate catalysts would be effectively the same as those provided herein for Inventive catalysts 1-4.

Comparative catalyst 1 was prepared from a nominal 100 μm Cr/silica catalyst having 1 wt. % Cr as the acetate, a surface area of 290 m²/g, and a pore volume of 1.63 mL/g. It was passed through an 80 mesh sieve, and the remainder left on the screen was discarded. The final catalyst had a d50 average particle size of 54.9 μm. The calcination procedure for Inventive catalyst 1 was used for Comparative catalyst 1.

Comparative catalyst 2 was prepared from a silica-coated alumina containing 40 wt. % silica and 60 wt. % alumina, and with a surface area of 450 m²/g, a pore volume of 1.2 mL/g, and a d50 average particle size of 44.3 microns. Chromium triacetate, 1.25 g, was dissolved into 50 mL of deionized water and combined with 30 g of the above support powder and stirred to incipient wetness to make a wet-sand consistency. The powder was the dried overnight in a vacuum oven set at 110° C. The calcination procedure for Inventive catalyst 1 was used for Comparative catalyst 2.

Comparative catalyst 3 was prepared from a nominal 80 micron silica, which had a surface area of 450 m²/g, a pore volume of 1.7 mL/g, and a d50 average particle size of 76.5 microns. In a typical preparation, 1.25 g of chromium acetate was dissolved in 150 mL of methanol, then 30 g of the silica was slurried in this solution for 1 hr. The temperature of the mixture was raised to the boiling point of the methanol which caused it to boil off over another 3 hr. Stirring was continued on the dry Cr/silica as the temperature was further raised to 180-200° C. where the powder was stirred under vacuum for 5 hr. The catalyst was cooled to room temperature and slurried in 150 mL of heptane, then 5.3 g of titanium tetraisopropropoxide was added to the heptane and the slurry was stirred another 2 hr. The temperature was raised again, causing the heptane to boil off over 3 hr, leaving the try Cr/silica-titania catalyst. The dry catalyst was further heated to 180-200° C. to remove volatiles under vacuum for another 3 hr, after which it was cooled and stored under nitrogen. The calcination procedure for Inventive catalyst 1 was used for Comparative catalyst 3, except that the hold temperature was 650° C.

Comparative catalyst 4 was a Cr/silica-titania catalyst obtained from W. R. Grace containing 1 wt. % Cr and 2.5 wt. % Ti, with a surface area of 530 m²/g, a pore volume of 2.6 mL/g, and a d50 average particle size of 133.6 microns. The calcination procedure for Inventive catalyst 1 was used for Comparative catalyst 4, except that the hold temperature was 650° C.

Comparative catalyst 5 was a Cr/silica catalyst from PQ Corporation containing 1 wt. % Cr, and with a surface area of 310 m²/g, a pore volume of 1.6 mL/g, and a d50 average particle size of 118.2 microns. The calcination procedure for Inventive catalyst 2 was used for Comparative catalyst 5.

Comparative catalyst 6 was a Cr/silica catalyst from PQ Corporation containing 1 wt. % Cr, and with a surface area of 308 m²/g, a pore volume of 1.5 mL/g, and a d50 average particle size of 50.6 microns. The calcination procedure for Inventive catalyst 2 was used for Comparative catalyst 6.

Comparative catalyst 7 was a Cr/silica catalyst from W. R. Grace containing 1 wt. % Cr, and with a surface area of 285 m²/g, a pore volume of 1.65 mL/g, and a d50 average particle size of 77.2 microns. The calcination procedure for Inventive catalyst 2 was used for Comparative catalyst 7.

Figure 2:
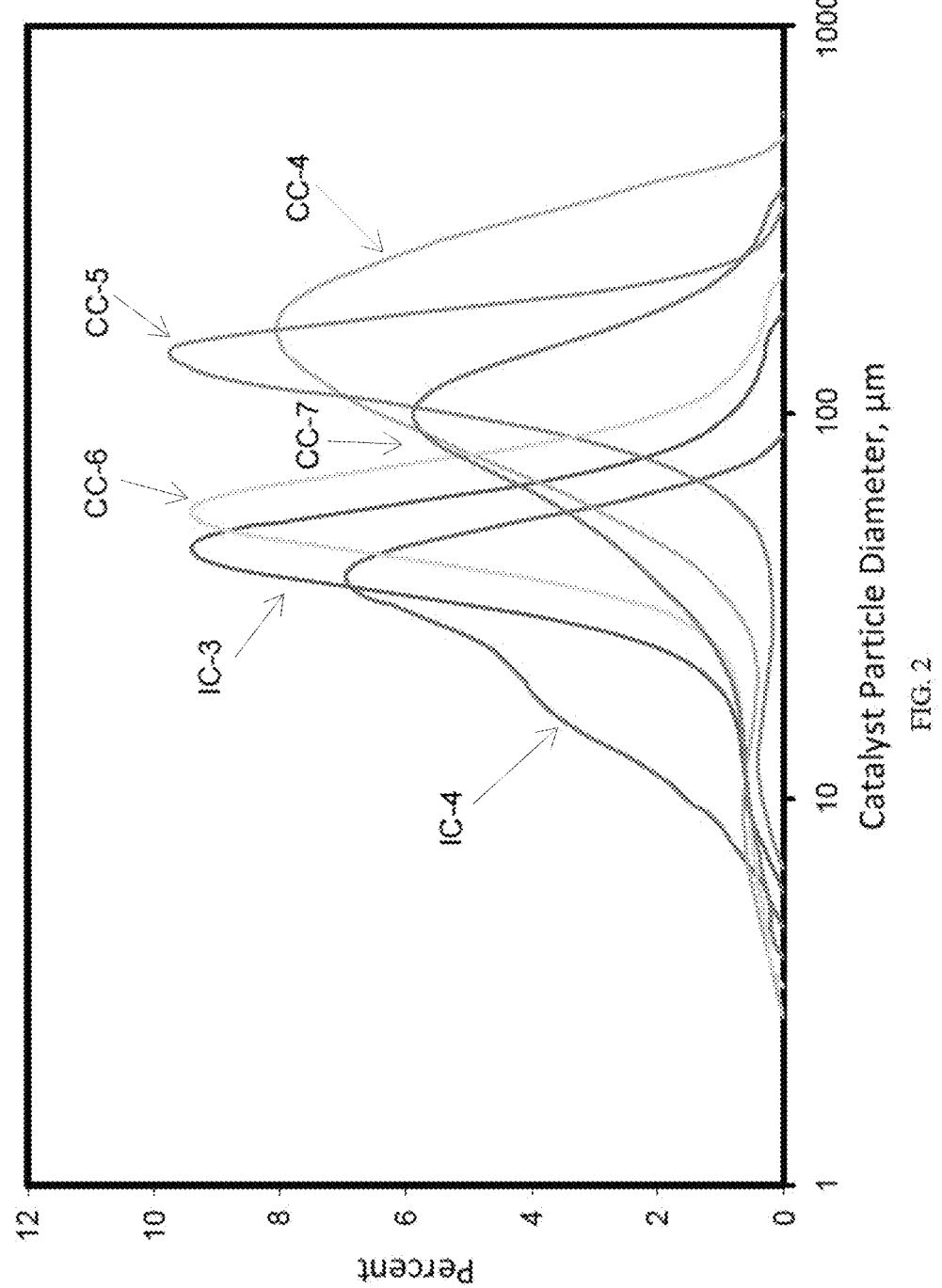
FIG. 2 presents a plot of the particle size distributions of Inventive chromium catalysts IC-3 and IC-4, and Comparative chromium catalysts CC-4, CC-5, CC-6, and CC-7.

FIGS. 1-2 illustrate the particle size distributions of these four inventive and seven comparative solid oxides or their resultant catalysts (percent of solid oxide or catalyst by weight versus the particle diameter plotted on a log-scale). Table 1 summarizes various parameters calculated from the particle size distributions of these catalysts. Less than 3 wt. % of Inventive catalysts IC-1 through IC-4 had a particle size greater than 100 μm. Less than 5 wt. % of the Inventive catalysts IC-1 through IC-4 had a particle size less than 10 μm, and the particle size span ((d90–d10)/d50) values were in the 0.8-1.4 range. Inventive catalysts IC-1 through IC-4 also had a d50 average particle size in the 19-41 μm range, a ratio of d80/d20 from 1.6 to 2.7, a d10 particle size in the 12-17 μm range, a d95 particle size in the 30-80 μm range, and with less than 6 wt. % having a particle size greater than 75 μm and less than 20 wt. % having a particle size less than 15 μm. In terms of the number of particles per gram of the solid oxide, Inventive catalysts IC-1 and IC-2 had effectively no particles (less than 1) per gram of the catalyst with a particle size greater than 150 μm and with a particle size greater than 100 μm.

When these supported chromium catalysts are used to polymerize ethylene, most of the catalyst particles are broken or disintegrated into imperceptibly small fragments that are dispersed in the final article, causing no problems, especially in thin film products. However, depending on the polymerization conditions, some catalyst particles can be ejected from the fluidized bed reactor before becoming active and thus before being disintegrated by polymerization. These non-fragmented catalyst particles can result in visual imperfections on the surface of the final product or article, usually called "gels" or "hard gels" or "catalyst gels," and film grades are especially sensitive to this issue (notably, such catalyst particle gels also can create noticeable defects on the surfaces of thick parts, resulting in poor surface aesthetics of the final product or article, and such surface roughness also can interfere with printing operations). Consequently, polymer film grades typically have a rigid manufacturing specification on gels greater than 200 microns in diameter. During manufacture of the polymer, the number of gels produced is automatically measured by an in-line camera, specially designed to count the gels greater than 200 microns in size.

Note that the observed gel-count thus measured can result from many causes other than catalyst particles, including contamination from foreign material, or other polymer particles, or additive particles, for example. The purpose of the present invention is to describe methods, catalysts, polymers, and articles/products that minimize gels derived specifically from catalyst particles.

Figure 3:
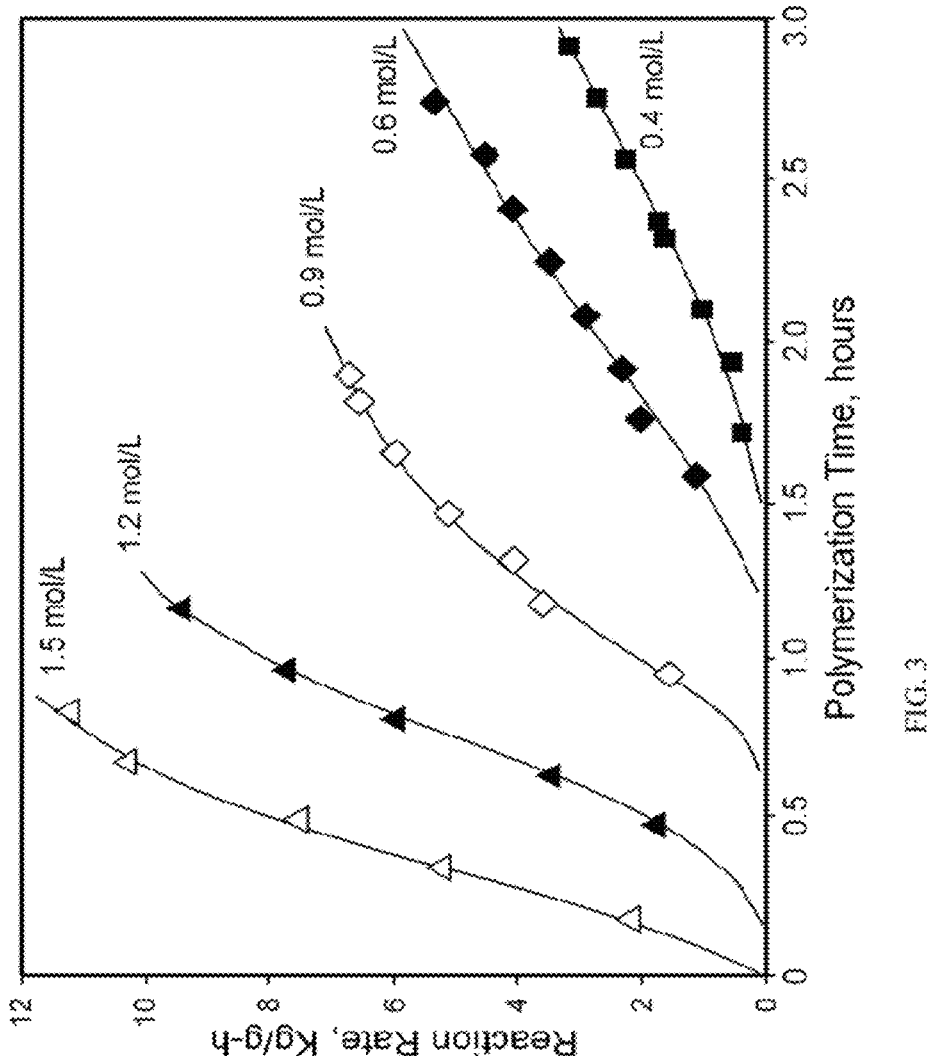
FIG. 3 presents a plot of the catalyst induction time and polymerization rate at different ethylene concentrations (mol/L) at 105° C.

FIG. 3 illustrates, in ethylene polymerization reactions, the relationship between ethylene concentration, catalyst induction time, and polymerization rate at a polymerization temperature of 105° C. for supported chromium/silica catalysts. From this relationship, it is possible to calculate the number of catalyst particles exiting the reactor intact (not fragmented). It is from these particles (over a certain size) that catalyst gels are derived. That is, with this information, and the starting particle size distribution of the catalyst (FIGS. 1-2), it is then possible to "model" the catalyst gel-count under a wide variety of reaction conditions. This is how the gel-count data in Table 2 was calculated for each of the inventive and comparative catalysts, while polymerizing ethylene under a variety of reaction conditions, including variations in the ethylene concentration, induction time, residence time, and catalyst productivity. It was observed by microscopic examination, that when chromium catalysts are used to make polymers, and when the polymer is converted into film, catalyst particles larger than a certain size can cause these "catalyst gels" or visual imperfections. Typically, in a 25 micron thick film, these gels appear to be approximately twice the diameter of the encapsulated catalyst particles. Thus, a 100 μm diameter catalyst particle will typically result in a 200 μm diameter film gel, which is sometimes called the "lens effect." This is how the gel-count was calculated in the model described above and in other subsequent data presented below.

Table 2 shows the effect of varying reaction conditions and varying catalyst types on the calculated film gel count of varying size gels, that is, from unfragmented catalyst particles (hard gels). The particle size distribution plays a surprisingly major role in determining this gel-count. Unexpectedly, under a wide range of operating conditions, Inventive catalysts 1, 2, and 4 (labeled IC-1, IC-2 and IC-4) resulted in effectively no catalyst gels in the film of greater than 200 μm per ft² of 25 micron film, that is, from the gels being caused by catalyst particles of 100 μm or more. Inventive catalyst IC-3 also performed surprisingly well, with at most 18 film gels of greater than 200 μm per ft² of 25 micron film (with the gels being caused by catalyst particles of 100 μm diameter or larger) over the same wide range of operating conditions.

Using the same data in Table 2 across the wide range of operating conditions, the catalyst particle gel count per 5 grams of the ethylene polymer (or per 5 grams of the downstream product or article formed from the polymer) also can be calculated. Inventive catalyst IC-3 resulted in from 2 to 18 catalyst particles of 100 µm or greater per ft² of 25 micron film, and using a nominal 0.945 density, this translates to a hard gel count range of approximately 4 to 41 catalyst particles of greater than of 100 µm per 5 grams of the ethylene polymer. Inventive catalysts IC-1, IC-2 and IC-4 would have less than 2 catalyst particles, and more likely less than 1 catalyst particle, of greater than of 100 µm per 5 grams of the ethylene polymer.

Figure 4:
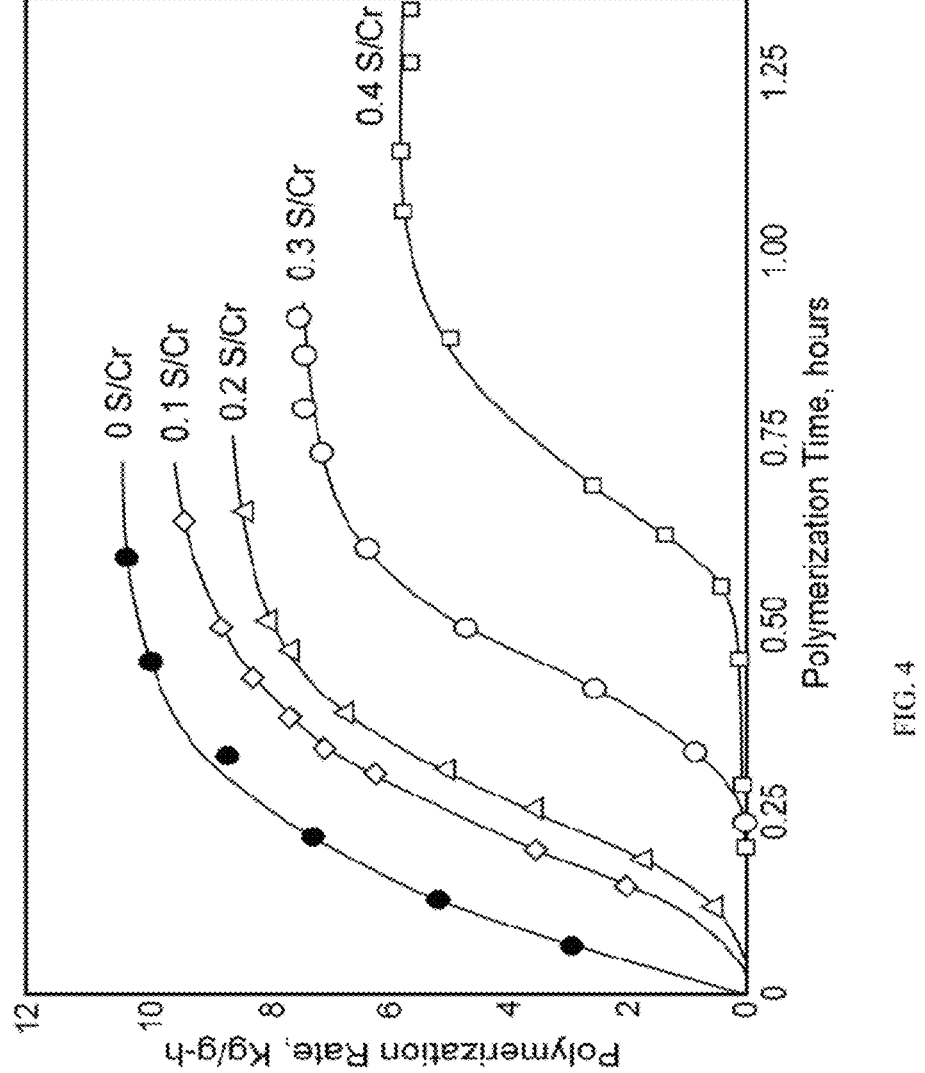
FIG. 4 presents a plot of the catalyst induction time and polymerization rate in the presence of different diethyl sulfide poison concentrations (sulfur/chromium molar ratio) at 105° C.

There are many polar or Lewis base compounds that, if inadvertently introduced into the reactor, even in ppm quantities, can bind to the chromium and inhibit the polymerization, such as oxygen, water, nitrogen compounds, and sulfur compounds. Consequently these compounds are called reaction "poisons." In FIG. 4, varying amounts of an organic sulfide poison (a particularly strong one) are deliberately added to the reactor to illustrate the relationship between poison concentration in the feedstock, catalyst induction time, and polymerization rate at a polymerization temperature of 105° C. for supported chromium/silica catalysts. This was done to reproduce the effect of unintended poisons on catalyst gel-count in normal manufacturing. Thus, increasing the amount of poison relative to the amount of chromium was found to increase the catalyst induction time, and therefore, the amount of gels should also increase correspondingly. From this relationship, the data in Table 3 was calculated from ethylene concentration, poison level, induction time, residence time, and catalyst productivity. Similar to Table 2, Table 3 shows the impact of the calculated film gel count—from large unfragmented catalyst particles (hard gels)—based on the particle size distribution of the catalyst (Inventive catalysts IC-1 through IC-4 and Comparative catalysts CC-1 through CC-7) and the reaction conditions, including the impact of the poison level. Unexpectedly, under a wide range of operating conditions, and regardless of poison level, Inventive catalyst examples IC-1, IC-2, and IC-4 resulted in effectively no film gels of greater than 200 µm per ft² of 25 micron film, with the gels being caused by catalyst particles of 100 µm or more. Inventive catalyst IC-3 also performed surprisingly well, with at most 50 film gels of greater than 200 µm per ft² of 25 micron film (with the gels being caused by catalyst particles of 100 µm diameter or more) over the same wide range of operating conditions.

Gels Versus Catalyst Productivity

Referring again to FIG. 3 and FIG. 4, it is clear why the gel count is related to the productivity of the catalyst, that is, the yield of polymer per unit of catalyst. In general, any variable that raises the productivity of the catalyst, such as higher ethylene concentration, or higher temperature, also tends to decrease the induction time, which in turn lowers the number of unfragmented catalyst particles exiting the reactor. Alternatively, variables that tend to diminish the catalyst productivity, such as poisons or lower temperature, tend to increase the induction time, and allow more uninitiated (intact) catalyst particles to exit the reactor per unit of polymer produced. The reactor residence time also plays a role, because shorter residence time tends to accelerate the rate of catalyst particles exiting the reactor. These correlations are also evident from Tables 2 and 3.

Figure 5:
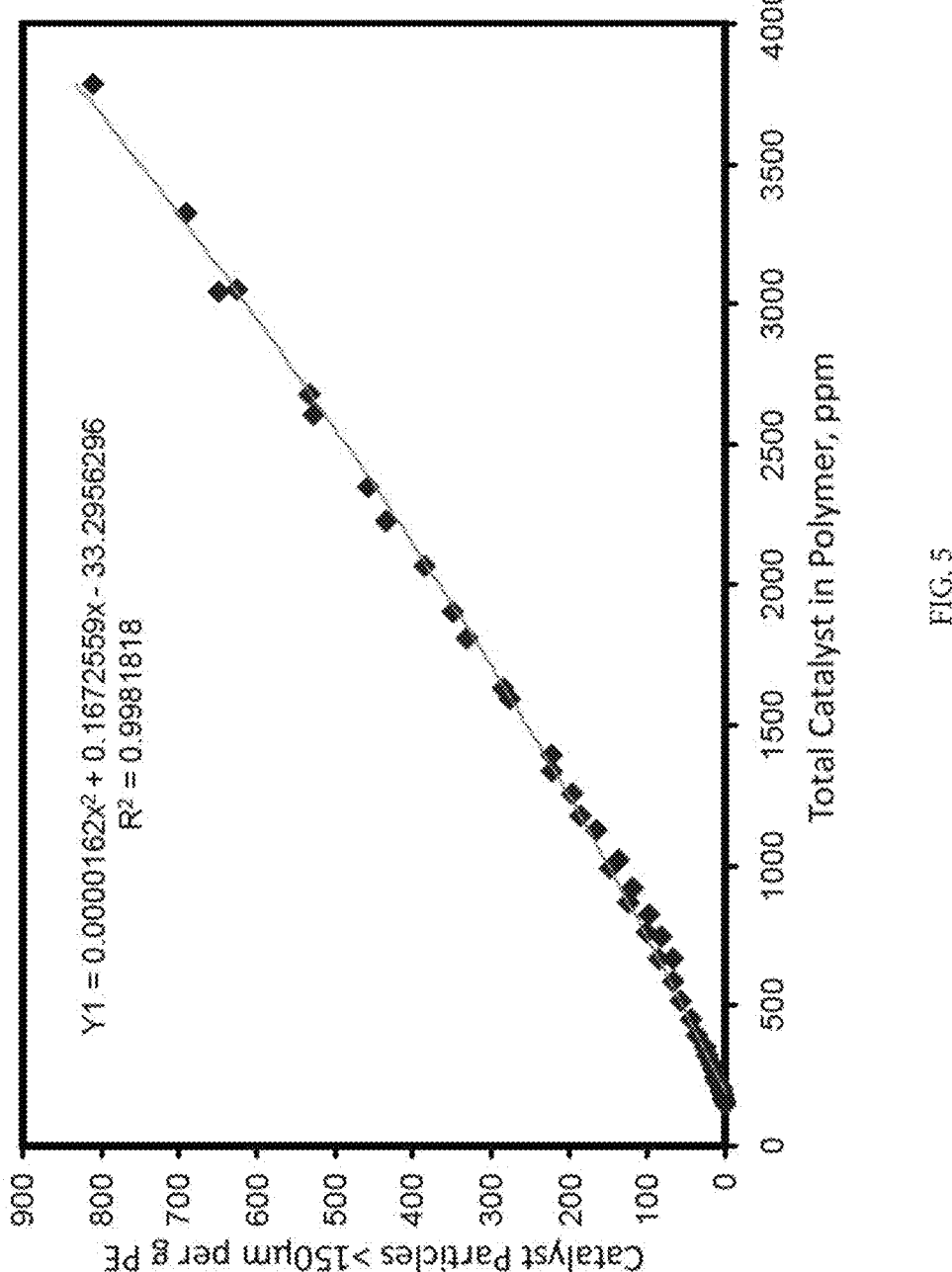
FIG. 5 presents a plot of the catalyst particles of greater than 150 μm per gram of ethylene polymer versus the ppm of catalyst in the ethylene polymer.

FIG. 5 illustrates this by plotting the gel levels of some of the polymers in these tables against the amount of catalyst residue (often referred to as "ash") in the polymer, which is inversely related to the productivity. The points on the graph indicate the expected gel-counts of polymers made using Comparative catalyst CC-4 under a wide assortment of reaction conditions, in which the residence time, temperature, and ethylene concentration were varied widely. FIG. 5 plots the number of catalyst particles in a gram of polymer that are larger than 150 micron diameter. These values are plotted against the total amount of catalyst residue left in the polymer (fragmented or not). A curved line is obtained by fitting the points, which has the following formula:

$$Y1 = 0.0000162x^2 + 0.1672559x - 33.2956296;$$

Y1 is the number of catalyst particles of >150 µm per gram of polymer, and x is the ppm by weight of catalyst remaining in the polymer.

Advantageously, if the inventive polymers in Tables 2 and 3 are plotted in FIG. 5, they all lie far below the Y1 line, and usually near zero.

Another correlation using Comparative catalyst CC-4 similar to FIG. 5 can be made for the film gel count of Y1 catalyst particle gels per ft² of 25 micron thick film, wherein film gels are of a size greater than 200 µm caused by 100+ µm catalyst particles, and this correlation is Y1=−1.09E+ 12x³+1.877E+09x²−3.569E+05x+65.5, wherein x is the weight fraction of ash (catalyst residue) in the ethylene polymer. The inventive polymers in Tables 2 and 3 have lower gels than that predicted by this equation for Y1 based on the CC-4 catalyst.

Figure 6:
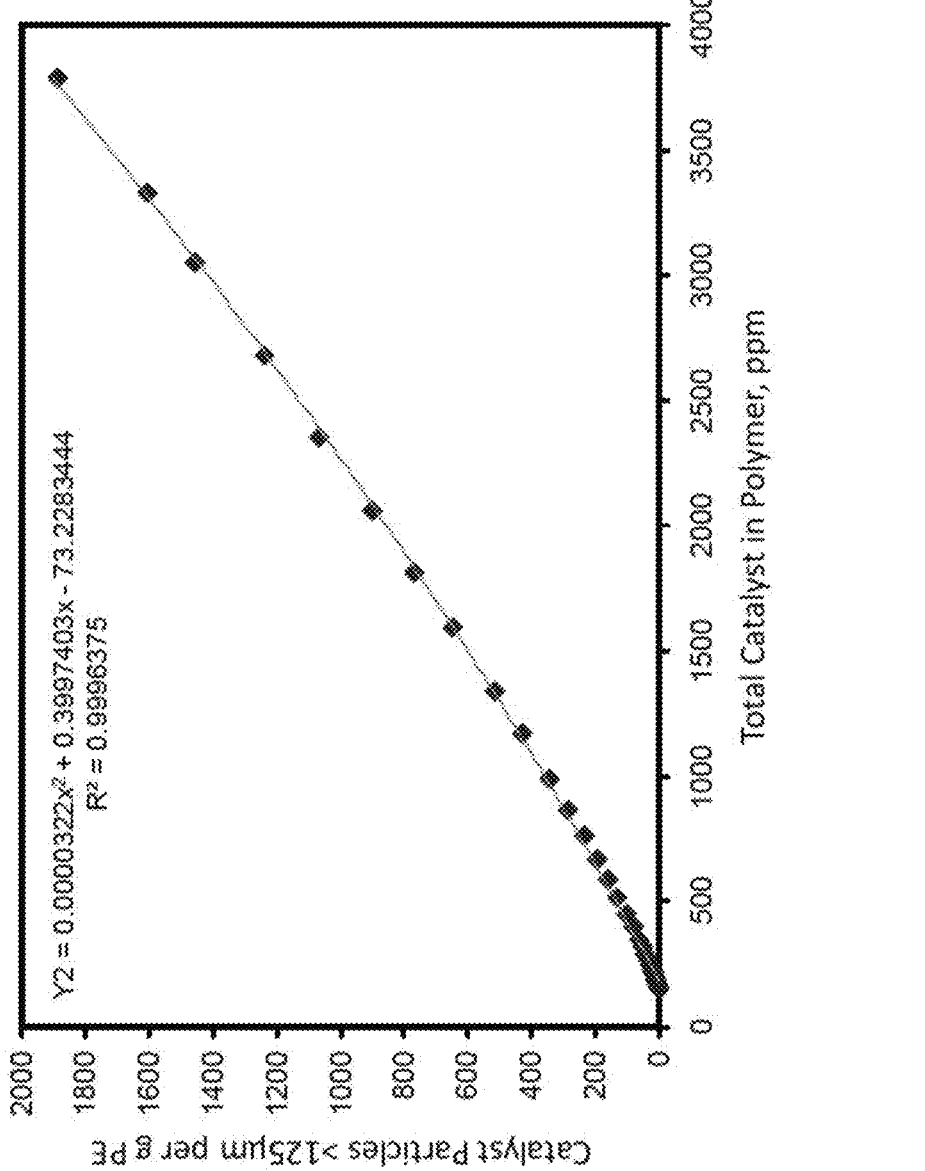
FIG. 6 presents a plot of the catalyst particles of greater than 125 μm per gram of ethylene polymer versus the ppm of catalyst in the ethylene polymer.

FIG. 6 is a similar to FIG. 5, however, the points in this graph indicate the number of unfragmented catalyst particles that are larger than 125 microns, measured in a variety of polymers. Once again, the catalyst used to make these polymers was Comparative catalyst CC-4 from a variety of different reaction conditions, and the gel count was measured as catalyst particles per gram of polymer. This value is then plotted against the total amount of all catalyst left in the polymer, in ppm by weight, whether fragmented or not. Once again the points were fit to a curve which is defined by:

$$Y2 = 0.0000322x^2 + 0.3997403x - 73.2283444;$$

Y2 is the number of catalyst particles of >125 µm per gram of polymer, and x is the ppm by weight of all catalyst remaining in the polymer.

Advantageously, if the inventive polymers in Tables 2 and 3 are plotted in FIG. 6, they all lie far below the Y2 line, and usually near zero.

Figure 7:
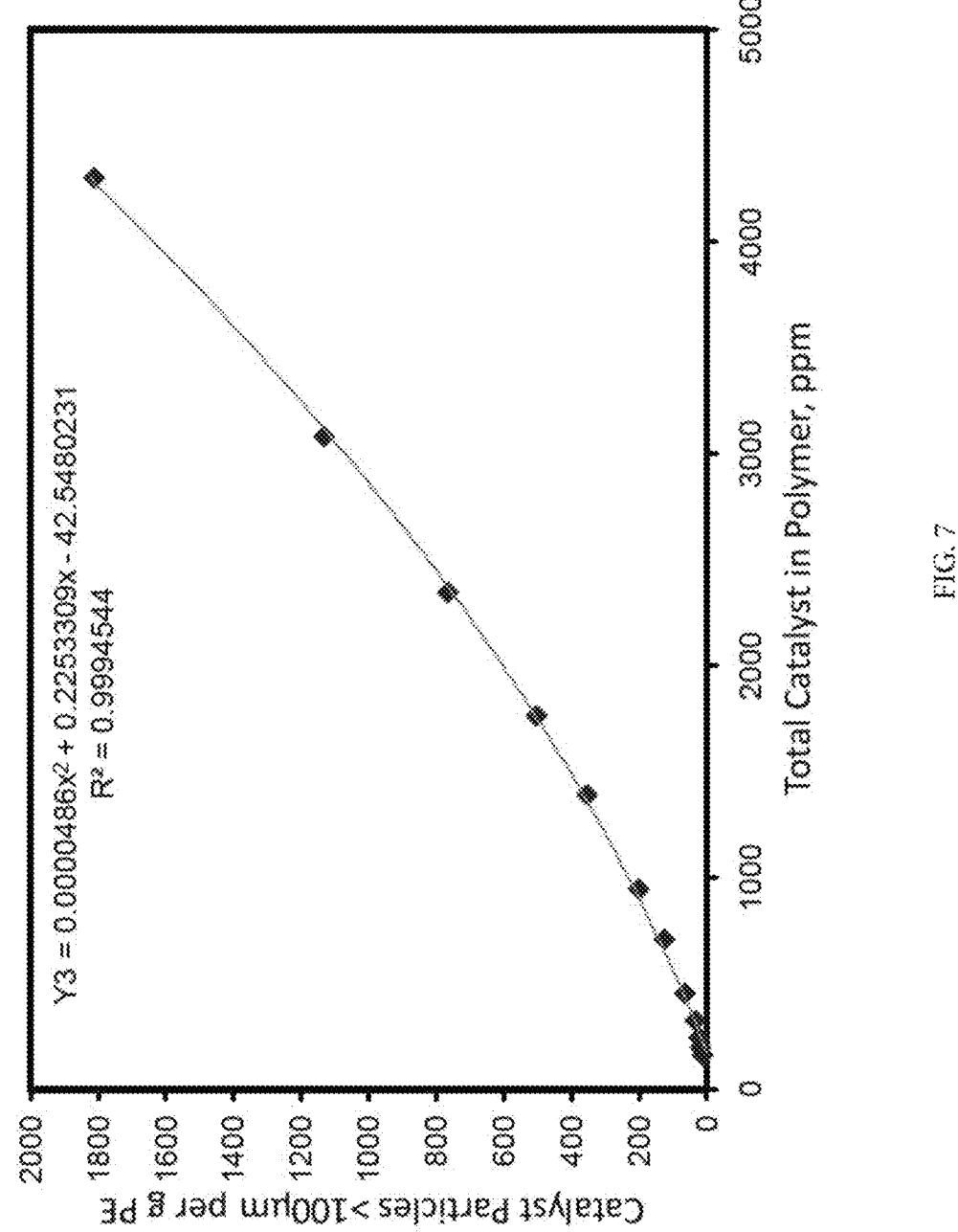
FIG. 7 presents a plot of the catalyst particles of greater than 100 μm per gram of ethylene polymer versus the ppm of catalyst in the ethylene polymer.

In FIG. 7, a similar plot was produced in the same way. However, the points in this graph indicate the number of unfragmented catalyst particles that are larger than 100 microns, measured in a variety of polymers. This time, the catalyst used to make these polymers was Comparative catalyst CC-5 from a variety of different reaction conditions, and the gel count was measured as catalyst particles per gram of polymer. This value is then plotted against the total amount of all catalyst left in the polymer, in ppm by weight, whether fragmented or not. Once again the points were fit to a curve which is defined by the following formula:

$$Y3 = 0.0000486x^2 + 0.2253309x - 42.5480231;$$

Y3 is the number of catalyst particles of >100 µm per gram of polymer, and x is the ppm by weight of all catalyst remaining in the polymer.

Advantageously, if the inventive polymers in Tables 2 and 3 are plotted in FIG. 7, they all lie far below the Y3 line, and usually near zero.

Another correlation using Comparative catalyst CC-5 similar to FIG. 7 can be made for the film gel count of Y3 catalyst particle gels per $ft^2$ of 25 micron thick film, wherein film gels are of a size greater than 200 µm caused by 100+ µm catalyst particles, and this correlation is Y3=3.215E+07$x^{1.564}$, wherein x is the weight fraction of ash in the ethylene polymer. The inventive polymers in Tables 2 and 3 have lower gels than that predicted by this equation for Y3 based on the CC-5 catalyst.

Figure 8:
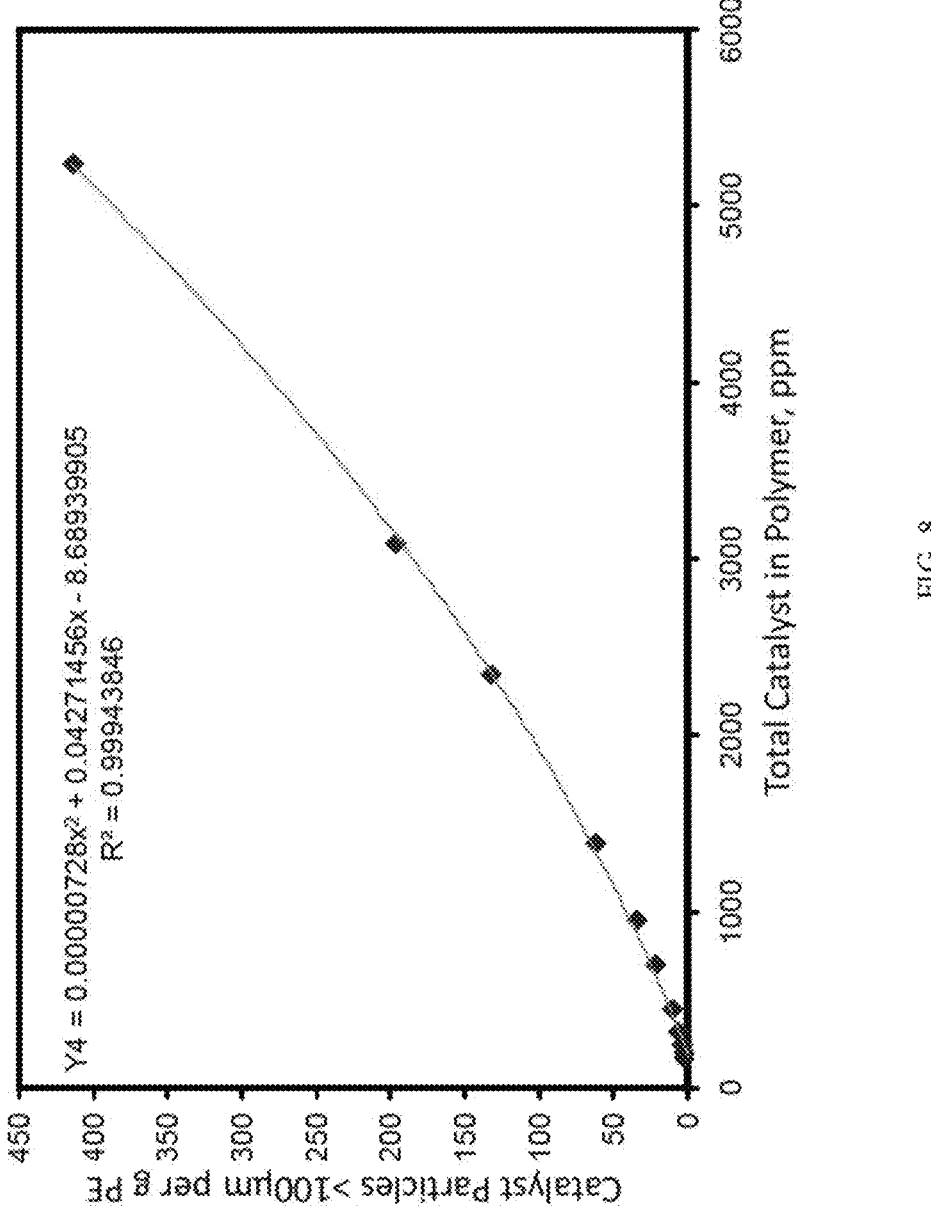
FIG. 8 presents a plot of the catalyst particles of greater than 100 μm per gram of ethylene polymer versus the ppm of catalyst in the ethylene polymer.

Lastly, FIG. 8 is one more graph, wherein the points represent polymers made with Comparative catalyst CC-6 made under a wide variety of reaction conditions. The number of unfragmented catalyst particles that are larger than 100 microns is plotted against the total amount of all catalyst left in the polymer, in ppm by weight, whether fragmented or not. Once again the points were fit to a curve which is defined by the following formula:

$$Y4 = 0.00000728x^2 + 0.04271456x - 8.68939905;$$

Y4 is the number of catalyst particles of >100 µm per gram of polymer, and x is the ppm by weight of all catalyst remaining in the polymer.

As above, if the inventive polymers in Tables 2 and 3 are plotted in FIG. 8, they all lie far below the Y4 line, and usually near zero.

Additional correlations can be made using Comparative catalysts CC-3 and CC-7. For CC-3, the film gel count of Y5 catalyst particle gels per $ft^2$ of 25 micron thick film, wherein film gels are of a size greater than 200 µm caused by 100+ µm catalyst particles, is Y5=9.48E+06$x^{1.38}$, wherein x is the weight fraction of ash in the ethylene polymer. For CC-7, the film gel count of Y6 catalyst particle gels per $ft^2$ of 25 micron thick film, wherein film gels are of a size greater than 200 µm caused by 100+ µm catalyst particles, is Y6=1.07E+08$x^{1.68}$, wherein x is the weight fraction of ash in the ethylene polymer. The inventive polymers in Tables 2 and 3 have lower gels than that predicted by these equations for Y5 and Y6 based on the CC-3 and CC-7 catalysts.

For any of the equations shown in FIGS. 5-8 and described by Y1-Y6 above, the inventive polymers have much lower gels, and thus fractions (80%, 50%, and 25%) of any of these equations can be used to describe the inventive ethylene polymers. For instance, the inventive ethylene polymers can have less catalyst particle gels than Y4=0.00000728$x^2$+0.04271456x−8.68939905, or less catalyst particle gels than Y4=0.80*(0.00000728$x^2$+0.04271456x−8.68939905), or less catalyst particle gels than Y4=0.50*(0.00000728$x^2$+0.04271456x−8.68939905), or less catalyst particle gels than Y4=0.25*(0.00000728$x^2$+0.04271456x−8.68939905), where Y4 is the number of catalyst particles of >100 µm per gram of polymer, and x is the ppm by weight of all catalyst (ash) remaining in the polymer.

Referring now to Table 4, which shows some typical molecular weight and rheological properties of common commercial polymers made using chromium catalysts supported on silica, silica-titania, silica-alumina, or other solid oxides. They are listed by Type, where each type represents a typical market application. These are the kinds of polymers made and that can be made using the chromium catalysts of this invention. Melt index, density, and MWD can be controlled by reaction variables, including the catalyst calcination temperature and conditions, the reactor temperature and reactant concentrations (ethylene, comonomer, hydrogen, co-catalysts, etc.). Using this invention, these polymer types can be made firstly as a powder/fluff, and then as pellets. However, using this invention, these polymers can be made more efficiently, more homogeneously, more cleanly, and more quickly, and beneficially with significantly less catalyst particle defects (hard gels).

Figure 9:
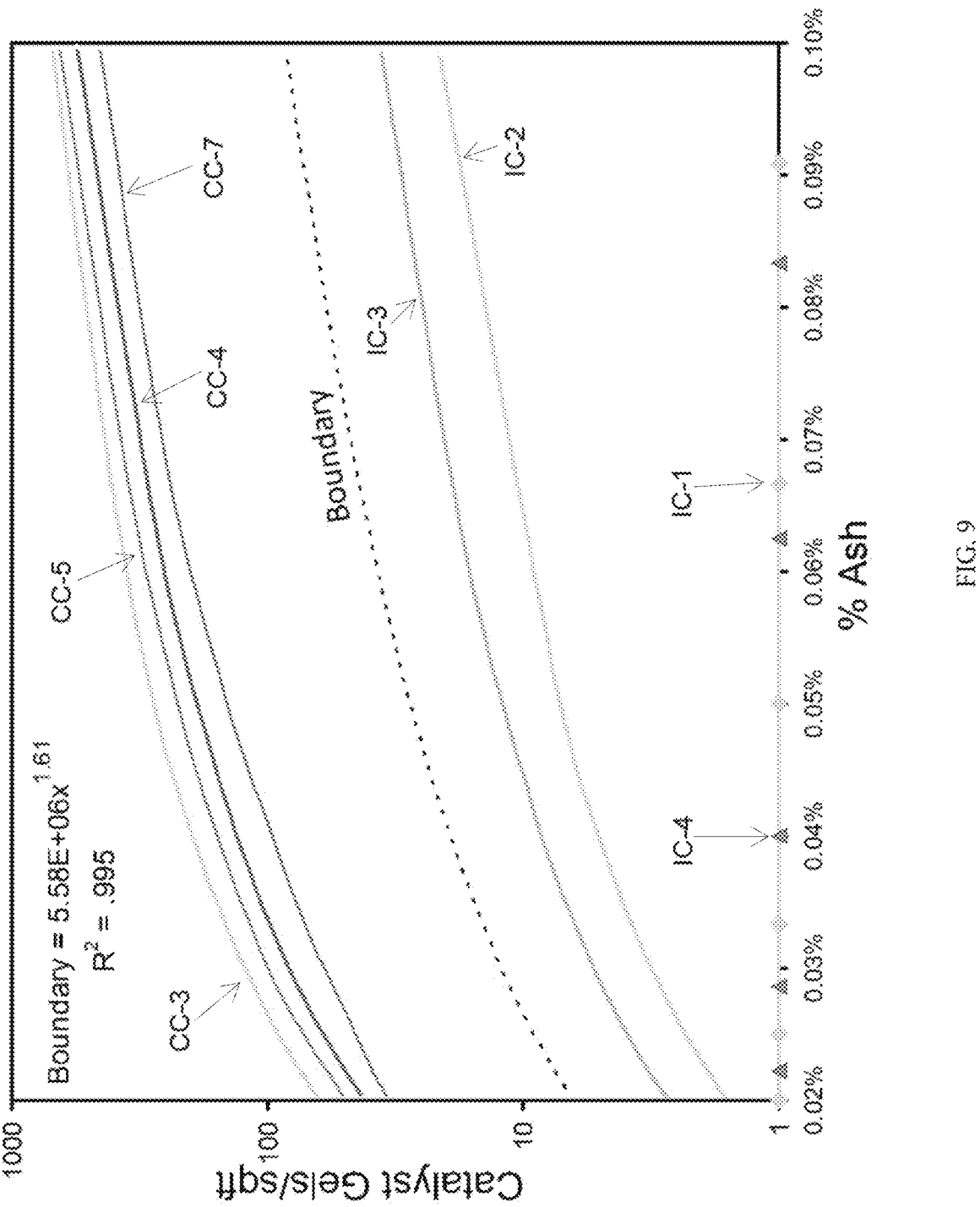
FIG. 9 presents a plot of the predicted catalyst gels per square foot of 25 micron film versus the ash content of the ethylene polymer.

Using the relationships between catalyst productivity and catalyst particle gels described hereinabove, FIG. 9 presents a plot of the predicted catalyst gels per square foot of 25 micron thick film versus the ash content of the ethylene polymer. This plot includes data for four inventive and four comparative catalysts. Unexpectedly, and beneficially, there is a large boundary area between the amounts of gels in films produced using the comparative catalysts as compared to the amounts of gels in films produced using the inventive catalysts. The equation for the dotted boundary line is Y1=5,580,000$x^{1.61}$, and Y1 is the film gel count of catalyst particle gels per $ft^2$ of 25 micron thick film, wherein film gels are of a size greater than 200 µm caused by catalyst particles, and x is the weight fraction of ash (solid oxide+chromium) in the ethylene polymer. For instance, when the ash content (x) is 0.0003 (0.03 wt. %), the gel count is equal to 12, and when the ash content is 0.0005 (0.05 wt. %), the gel count is equal to 27. From FIG. 9, it is apparent that the amounts of gels in films produced using the inventive catalysts are less than Y1=1.20*(5,580,000$x^{1.61}$) and less than Y1=5,580,000$x^{1.61}$, and for some of the inventive catalysts, less than Y1=0.80*(5,580,000$x^{1.61}$), less than Y1=0.50*(5,580,000$x^{1.61}$), and/or less than Y1=0.25*(5,580,000$x^{1.61}$). The gel count for two of the inventive catalysts are predicted to be 1 gel or less throughout the ash content range.

Measured Catalyst Gels

Each line in Table 5 summarizes certain measurements conducted on numerous Grade D-1 (see Table 4) polymers which were produced using comparative catalysts CC-3 and/or CC-4 in a commercial-scale loop slurry reactor, although analogous data can be derived from a fluidized bed reactor. Similar polymer was produced using Invention catalyst IC-3 on a pilot scale loop reactor and is shown in Table 5 as well, although analogous data can be derived from a fluidized bed reactor. The measurements in Table 5 include 1) the ash content of the polymer (measured by ASTM D5630-13 procedure B), 2) the measured number of gels/$ft^2$ that were larger than 200 µm from a 25 micron thick film again made from that same polymer, and finally 3) a random sampling of 10 large gels were taken from the film in #2 and further analyzed. The number of catalyst gels are shown in column 5 of Table 5. In column 6, the total gel-count in column 4 is multiplied by the fraction of sampled catalyst gels in column 5, to result in the total number of measured catalyst gels in column 6. Column 6 is then compared to column 7, which is the theoretical number of catalyst gels, as derived from the previously described gel model.

Herein, the ASTM ash content encompasses the amount of solid oxide (e.g., silica) and chromium. Since chromium is a very minor portion of the ash content, the ash content is very close to the solid oxide content, but solid oxide content herein equals ash content minus chromium content.

Most Cr polymerization catalysts contain about 1 wt. % total Cr for loop slurry processes, usually in the form of Cr(III) prior to calcination. During this last preparation step, the catalyst is then activated by calcination, which converts a portion of the initial Cr(III) to Cr(VI). The catalyst recipe used to make catalysts for this particular polymer grade tends to convert most of the Cr into Cr(VI). Typically, and in this study, chromium (VI) content of the calcined catalyst or ash was determined as follows. A small sample, typically about half a gram, was first slurried in about 25 mL of deionized water and 25 mL of 18 N sulfuric acid, to which is added 4 drops of indicator solution (1,10-phenanthroline iron (II) sulfate, 0.025 M in water), all in a 250 ml beaker with a magnetic stir bar. The resulting mixture should be a yellow-green color. While stirring, this mixture was titrated using approximately 0.025 M ferrous ammonium sulfate solution (FAS). The mixture should go through several color changes, becoming greener and gradually turning to a blue color, then finally quickly turning red-orange. When the mixture turns red-orange, the titration is complete. The wt. % Cr(VI) was determined from the following formula:

$$\text{Chromium wt. } \% = 1.733\%(FAS \text{ molarity})(FAS \text{ mL})/(\text{sample in g}).$$

Note that the chromium content (or loading) in supported silyl chromate catalysts for fluidized bed reactors is often lower (e.g., less than 0.5 wt. %) than for loop slurry polymerization. Further, a final activation/calcination step is not required for silyl chromate catalysts. Nonetheless, chromium (VI) content can be determined using the same technique described above.

Gel counting was performed on 25 μm thick film from a Killion 125 cast film line with a die width of 203 mm. This used a CR7 winder model, using a cooler bath temperature of 23° C. The gel inspection area was 3 square meters. The screw diameter was 1.24 inches, running at 10 rpm, the line speed at approximately 3 lb/hr, and the temperature zones were all set at 400° F. The upper and lower take-up rolls were set at 35. Before measurements were made, the machine was purged for 120 minutes. The chill roll speed was set to 23 rpm.

Film gels were measured on the 25 μm thick film using an automated camera-based gel counting machine; the camera model was a FSA100 and Optical Control System (OCS) software was used. The system included a light source and a detector. The film was passed through the system, between the light source and the detector, with a 150-mm inspection width. The 3 square meters of film area were inspected and the gels with sizes of greater than 200 μm were analyzed, and then normalized per square foot of film—this is the measured gels/ft² of 25 micron thick film in Table 5.

To determine the relative amount of all the gels that were catalyst particle gels, 10 large gels were picked at random from a 1.5 sqft sheet of 25 micron film. Then the composition of each of the 10 gels was determined (e.g., catalyst particles, cellulose, cross-linked polymer, additives, and so forth). One of skill in the art would readily be able to determine the cause of the gels using a variety of non-limiting techniques such as hot-stage microscopy (and observing melting behavior), infrared spectroscopy, electron microscopy, and the like. For instance, an IR spectrum can be used to help determine if the gel is the result of a catalyst particle or something else. IR can even be used to determine what catalyst is responsible for the gels, in situations where multiple catalysts are used in one reactor to make different polymer grades.

For the exceptions in Table 5 with an asterisk, a larger number of gel samples were analyzed. Inventive ethylene polymers were produced with inventive catalyst IC-3 in pilot scale loop slurry polymerizations using a 30-gallon slurry loop reactor at a production rate of 30-33 pounds of polymer per hour. Polymerizations were carried out under continuous particle form process conditions in a loop reactor (also referred to as a slurry process) by contacting the supported chromium catalyst with ethylene and 1-hexene in isobutane to produce a nominal ~30-35 HLMI and nominal ~0.952-0.956 density ethylene copolymer, although a similar ethylene copolymer can be prepared in a fluidized bed reactor. Loop reactor conditions included a reactor pressure of 600 psig, a mol % ethylene of 4-7 wt. % (based on isobutane diluent), a 1-hexene content of 0.4-0.8 mol % (based on isobutane diluent), 0.5-0.8 lb of hydrogen per 1000 lb of ethylene, and a polymerization temperature of 105° C. The reactor was operated to have a residence time of 75 min. The supported chromium catalyst was fed to the reactor at the rate of 4-9 g per hour.

Figure 10:
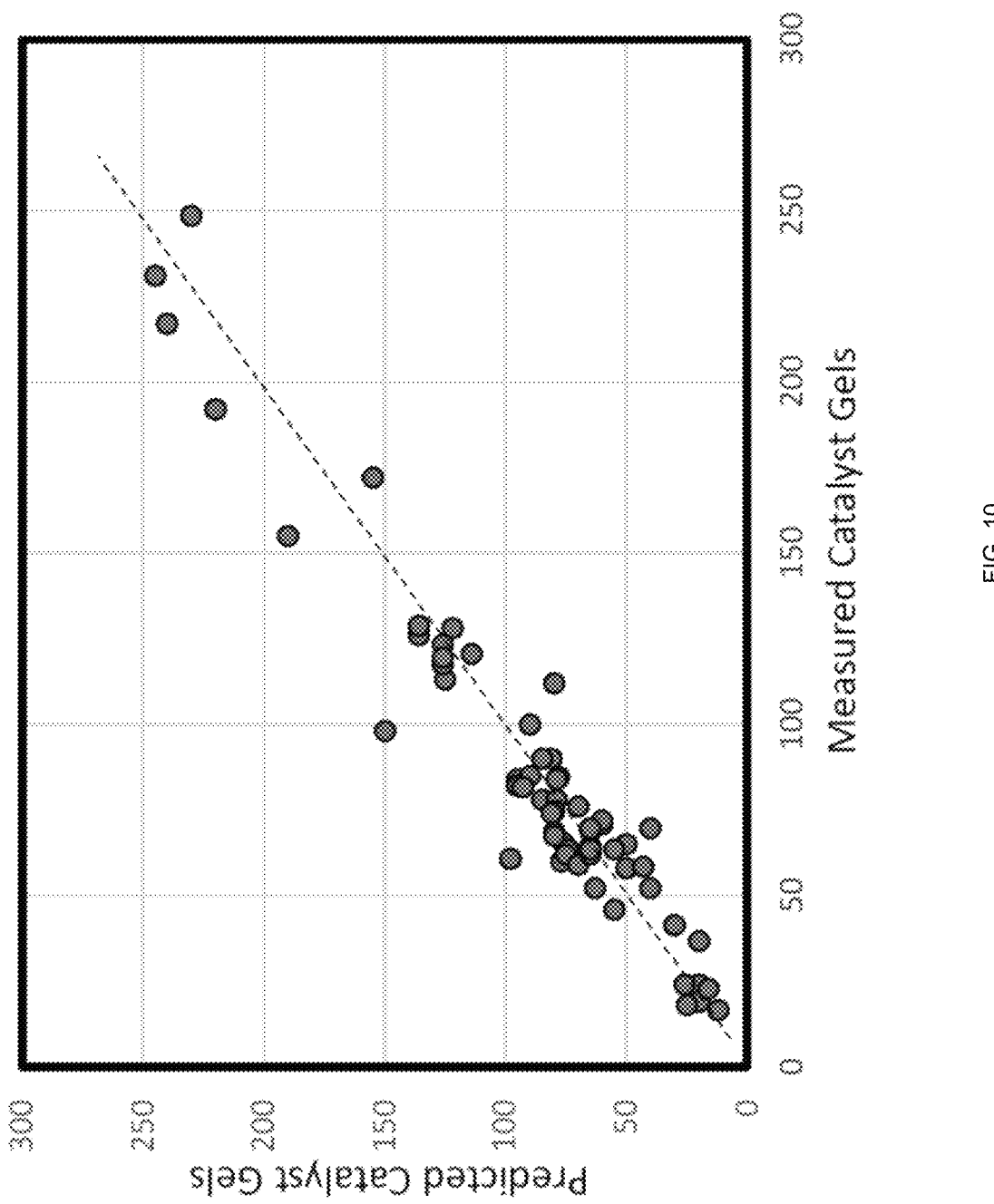
FIG. 10 presents a plot of the predicted catalyst gels versus measured catalyst gels.

Also listed in Table 5 are predicted gel counts using the procedures and models described hereinabove, and surprisingly, there was an excellent correlation between the model predicted catalyst gel amounts and the total catalyst gels (measured), and this excellent correlation is illustrated in FIG. 10. In the plot of predicated catalyst gels versus measured catalyst gels, a straight line is formed having a slope of 1.0.

Figure 11:
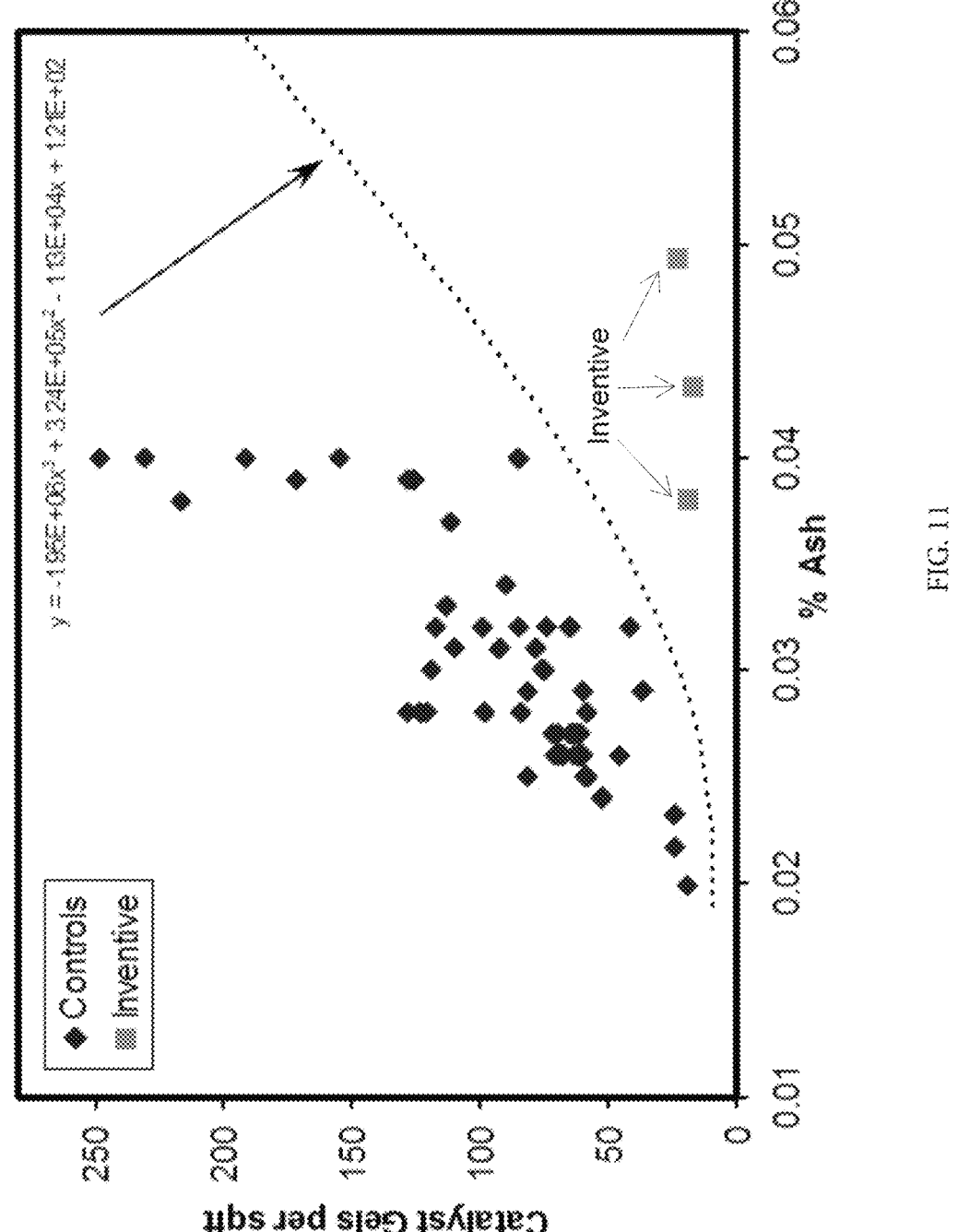
FIG. 11 presents a plot of the measured catalyst gels per square foot of 25 micron film versus the ash content of the ethylene polymer.

From Table 5, FIG. 11 is a plot of the (measured) total catalyst gels per square foot of 25 micron film versus the ash content of each ethylene polymer. Similar to FIG. 9, FIG. 11 shows a clear trend of increasing catalyst gels with increasing ash content. However in FIG. 11, the three inventive examples produced with inventive catalyst IC-3 fall far below the line in FIG. 11. The equation in FIG. 11 was derived to separate the inventive polymers from the control polymers. Through the ash content range from ~0.038 wt. % to ~0.05 wt. %, the line moves from about 50 to about 120 catalyst gels, whereas the inventive examples unexpectedly had only 17-23 catalyst gels.

In addition to quantifying catalyst gels using laser counting of films, it is also possible to measure gels in another way starting from any form of the polymer, including the original powder, or pellets, or even various molded articles beyond just film. To accomplish this, catalyst particles were recovered from polymer pellets, then sorted by particle size, and finally counted to obtain the number of catalyst particles larger than 100 μm diameter that remained unfragmented by the polymerization reaction.

In this experiment, commercial HDPE pellets of an ethylene polymer (Grade D-1 in Table 4) having a HLMI of approximately 25 and a 0.938 density, and produced using control catalyst CC-4, were the basis of a test to determine the number of catalyst particles of greater than 100 μm per gram of recovered ash (and therefore, per 5 grams of polymer). First, a large 2788 g sample of the polymer pellets was gently burned away to produce ash (e.g., catalyst residue of silica-titania solid oxide and chromium) in a metal bowl. It was heated gently causing melting and eventually, with continued raising of the applied temperature, the polymer began to burn. This was estimated to have occurred at when the external heat source reached about 450° C. As the molten polymer burned, its temperature was 280-320° C. The polymer gradually decomposed over about four hours, while the flame was controlled at a calm height by adjusting the access to oxygen.

After four hours the polymer was depleted, leaving only some ash (catalyst residue) mixed in with carbon black from the sides of the metal bowl. To separate the catalyst ash from the carbon black, the bowl was then placed in a muffle furnace, and the temperature was slowly ramped up, over three hours, to 550° C., then maintained at that temperature in still air for another 12 hours, followed by cooling to room temperature. The ash color changed from black to a bright yellow, which was also the color of the starting Cr/silica-titania catalyst. The ash was carefully recovered and weighed (1.04 g). The ash content was 0.0373 wt. % (373 ppm) of the polymer, which is typical for this grade of ethylene polymer. This would indicate a catalyst activity of 2681 g of polymer per g catalyst (the reciprocal). This ash value also correlated almost exactly with the small-scale ash test (ASTM D5630-13) that was routinely carried out during the production of this lot of ethylene polymer, which analyzed at 0.038 wt. % ash (380 ppm).

The yellow color of the recovered ash is due to the presence of Cr(VI). The original catalyst was manufactured to contain nominally 1 wt. % % Cr, and upon calcination, typically >90% of that Cr is oxidized to Cr(VI), which has a yellow-orange color. In the current experiment, the ash was then titrated with a ferrous ammonium sulfate solution (FAS) as described above, and the amount of Cr(VI) present in the ash was found to be 0.93 wt. %, which is a very typical, thus equating to approximately 3.5 ppm Cr(VI) in the ethylene polymer. After ash testing, there is a very minor amount of chromium that is not Cr(VI), therefore the Cr(VI) analytical result—for the purposes of determining the ppm amount of chromium in the polymer (or downstream article)—is considered equivalent to the amount of total chromium. Thus, there was approximately 3.5 ppm chromium in the ethylene polymer.

Figure 12:
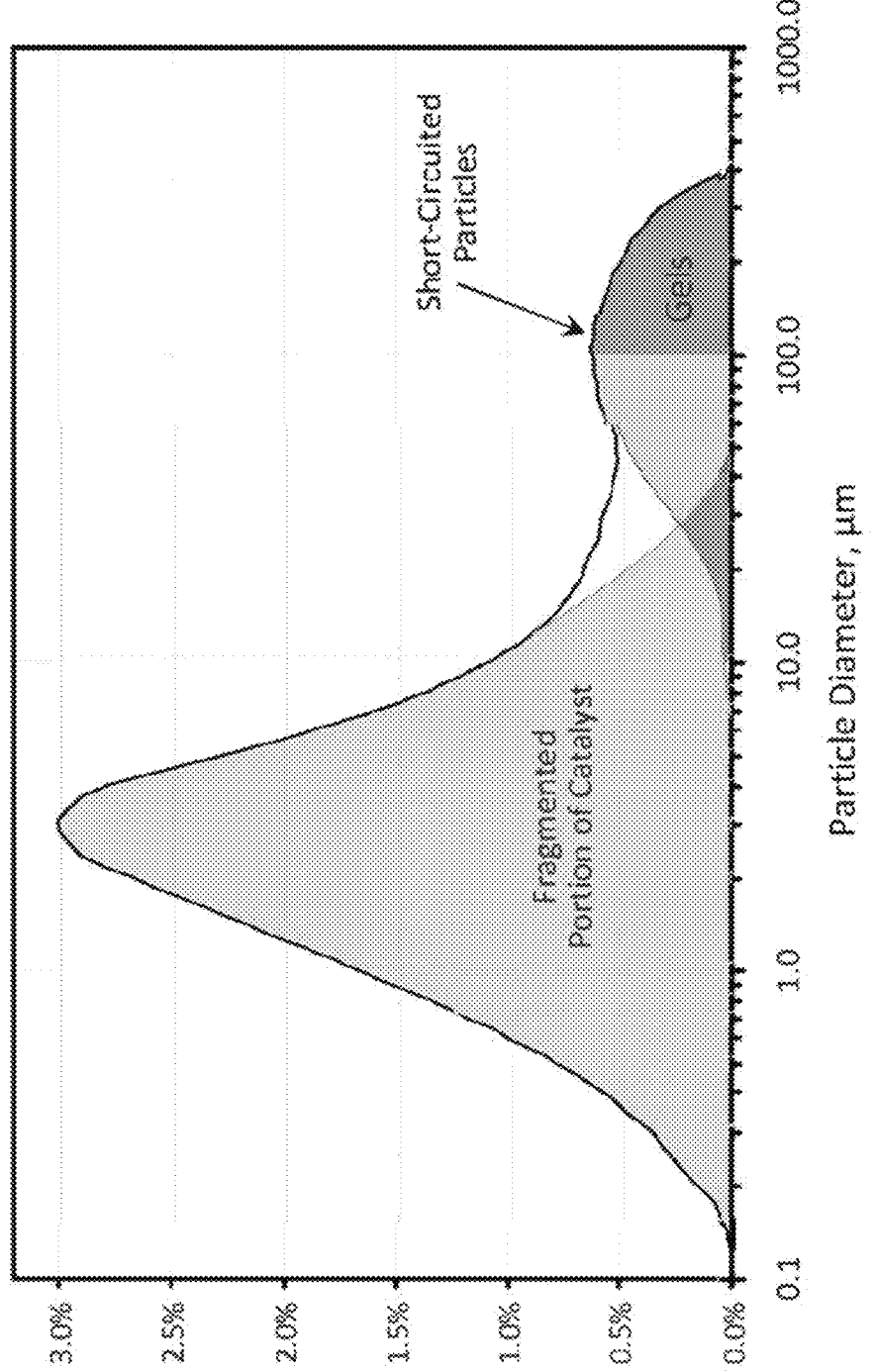
FIG. 12 presents a plot of the particle size distribution of ash from an ethylene polymer illustrating the number of catalyst particles with a diameter over 100 microns.

The ash from this experiment was then tested in a laser particle size analyzer (Microtrac S3500, as described above) to determine the particle size distribution of the recovered catalyst ash, which is illustrated in FIG. 12. As expected, most of the catalyst was completely broken up into ultra-fines (e.g., less than 5 μm) by the polymerization mechanism itself, as explained above. However, a small amount of the recovered ash shows up in the large-particle area of the distribution as a second population. This is the portion of catalyst that passed through the reactor (short-circuited) without significant breakage. And the largest of this small population, those particles of at least 100 μm, represents the source of catalyst gels measured by the laser gel counter on the film.

To actually count the number of gels over 100 μm in the ash, additional calculations are needed, which are summarized in Table 6. A square foot of 25 micron thick film occupies a volume of 2.32 mL. Based on a polymer density of 0.938, the weight is 2.18 g. The polymer contained 0.0373 wt. % catalyst ash, thus yielding the weight of catalyst in the square foot of film (and 25 microns thick) of 0.00081 g. The density of the catalyst is 0.317 g/mL, and therefore taking the inverse, each gram of catalyst takes up 3.15 mL of space, which is the sum of the pore volume and the skeletal volume.

Therefore, the volume of the catalyst inside the square foot of film (and 25 microns thick) is 0.00256 mL. This number is then used later with the laser particle size distribution.

The particle size analyzer sorts particles by size into size-groups or size channels. An abbreviated table of size channels for larger size particles is shown in Table 7 for the ash sample of the current experiment. The first column in Table 7 lists the diameter of particles in each channel, and the second column provides the relative amount of catalyst ash that was found in each channel, in vol %. Plotting column 2 against column 1 provides the particle size distribution in FIG. 12. Column 3 is a calculation of the volume occupied by each particle size using its diameter in column 1 and the formula to calculate the volume of a sphere—$(4/3)\pi r^3$. In column 4, the catalyst volume inside the square foot of film (at 25 microns thick)—0.00256 mL from Table 6—is distributed between the different size channels simply by multiplying it by measured vol % shown in column 2. This produces column 4, which is just the amount of catalyst volume belonging to each size channel. The sum of this column yields 0.00256, the total catalyst volume shown in Table 6. Then, dividing column 4, the total amount of catalyst volume in each size channel, by column 3, the amount of catalyst volume occupied by a single particle, results in column 5, which is the total number of particles of each size that are contained in a square foot of film (and 25 microns thick). In this experiment, the sum of all the particles in column 5 that are larger than 100 μm (with interpolating between the last 2 channels in Table 7) is 127. Converting this to a weight basis, this equates to approximately 290 catalyst particles of greater than 100 μm per 5 grams of the ethylene polymer.

This measured gel count number of 127 catalyst particles that are larger than 100 μm per ft$^2$ (for 25 micron thick film) compares very favorably to the model and predictions disclosed hereinabove. Using the catalyst particle size of control catalyst CC-4, a low poison level, and a productivity of 2681, results in a predicted gel-count value of 119 catalyst gels of larger than 100 μm diameter, per square foot of 25 μm film. These values are within 7% of each other.

On a weight basis, this comparative experiment resulted in approximately 290 catalyst particles of greater than 100 μm per 5 grams of the ethylene polymer. The inventive examples have much less, and in some cases, no catalyst particles of greater than 100 μm per 5 grams of the ethylene polymer. An abbreviated table of size channels for larger size particles is shown in Table 8 for Inventive catalyst IC-1 (the particle size distribution of which is shown in FIG. 1). Note that this data in Table 8 is for the catalyst prior to polymerization, unlike Table 7, which is after polymerization. Nonetheless, Table 8 indicates that any polymer produced using IC-1 would have a gel count of zero catalyst particles of greater than 100 μm per 5 grams of the ethylene polymer. Likewise, any polymer produced using Inventive catalyst IC-2 also would have a gel count of zero catalyst particles of greater than 100 μm per 5 grams of the ethylene polymer.

TABLE 1

| Example | IC-1 | IC-2 | IC-3 | IC-4 | CC-1 | CC-2 | CC-3 | CC-4 | CC-5 | CC-6 | CC-7 |
|---|---|---|---|---|---|---|---|---|---|---|---|
| Mv, μm | 20.2 | 28.1 | 42.3 | 30.4 | 55.7 | 48.2 | 79.5 | 136.6 | 116.6 | 52.85 | 84.19 |
| Mn, μm | 2.63 | 18.2 | 42.3 | 6.29 | 14.10 | 4.61 | 13.08 | 5.80 | 12.94 | 6.69 | 7.99 |
| Mv/Mn | 3.59 | 1.5 | 7.8 | 4.8 | 4.0 | 10.44 | 6.1 | 23.6 | 9.0 | 7.9 | 10.5 |
| Mp, μm | 20.2 | 31.1 | 45.6 | 33.0 | 62.2 | 57.0 | 88.0 | 170.2 | 148.0 | 57.06 | 95.96 |
| St Dev, μm | 5.97 | 9.61 | 17.3 | 14.4 | 22.62 | 27.25 | 30.76 | 70.44 | 40.25 | 21.61 | 50.14 |

TABLE 1-continued

| Example | IC-1 | IC-2 | IC-3 | IC-4 | CC-1 | CC-2 | CC-3 | CC-4 | CC-5 | CC-6 | CC-7 |
|---|---|---|---|---|---|---|---|---|---|---|---|
| Mp-Mn Separation | 0.2% | 9.6% | 7.4% | 7.9% | 10.5% | 15.5% | 9.7% | 19.7% | 21.2% | 7.4% | 12.3% |
| Mv/Mp | 1.00 | 0.90 | 0.93 | 0.92 | 0.90 | 0.84 | 0.90 | 0.80 | 0.79 | 0.93 | 0.88 |
| Ma, μm | 16.4 | 24.4 | 26.7 | 21.8 | 40.6 | 26.0 | 54.3 | 71.5 | 40.08 | 33.40 | 43.4 |
| Mp/Ma | 1.23 | 1.27 | 1.71 | 1.51 | 1.53 | 2.19 | 1.62 | 2.38 | 3.69 | 1.71 | 2.21 |
| Mp-Ma, μm | 3.8 | 6.70 | 18.93 | 11.18 | 21.66 | 30.98 | 33.73 | 98.76 | 107.92 | 23.66 | 52.56 |
| Full Breadth, μm | 50.5 | 96.9 | 176.9 | 112.2 | 185.4 | 227.3 | 264.9 | 638.1 | 345.5 | 224.93 | 380.01 |
| 1/2 ht Breadth, μm | 12.76 | 23.00 | 31.06 | 39.14 | 45.83 | 75.90 | 78.64 | 270.47 | 96.30 | 39.3 | 113.42 |
| Weight Percentile, μm | | | | | | | | | | | |
| 10% | 12.74 | 16.37 | 15.66 | 11.76 | 22.94 | 14.12 | 38.69 | 40.40 | 61.73 | 19.57 | 21.48 |
| 20% | 15.06 | 19.00 | 27.25 | 15.76 | 36.42 | 23.12 | 54.02 | 69.18 | 87.11 | 34.06 | 37.80 |
| 30% | 16.59 | 22.00 | 32.70 | 19.66 | 43.80 | 30.60 | 62.33 | 91.20 | 101.21 | 40.87 | 51.76 |
| 40% | 17.95 | 23.98 | 36.78 | 23.92 | 49.56 | 37.48 | 69.43 | 112.00 | 110.08 | 45.98 | 64.76 |
| 50% | 19.31 | 26.19 | 40.50 | 28.23 | 54.85 | 44.25 | 76.51 | 133.60 | 118.17 | 50.63 | 77.22 |
| 60% | 20.79 | 28.50 | 44.42 | 32.44 | 60.20 | 51.30 | 84.14 | 158.48 | 127.32 | 55.53 | 89.97 |
| 70% | 22.55 | 31.10 | 48.96 | 36.65 | 66.10 | 59.17 | 93.19 | 190.01 | 144.23 | 61.20 | 104.4 |
| 80% | 24.94 | 36.80 | 55.12 | 41.92 | 73.64 | 69.13 | 104.9 | 239.10 | 154.12 | 68.90 | 122.5 |
| 90% | 27.15 | 42.00 | 66.26 | 49.20 | 85.74 | 85.20 | 124.0 | 284.40 | 169.77 | 82.82 | 152.1 |
| 95% | 33.77 | 50.00 | 79.68 | 55.47 | 97.81 | 101.8 | 142.4 | 335.02 | 192.52 | 99.60 | 182.5 |
| D90/D10 | 2.29 | 2.57 | 4.23 | 4.18 | 3.74 | 6.03 | 3.20 | 7.04 | 2.75 | 4.23 | 7.08 |
| D90/D10, μm | 16.4 | 25.6 | 50.6 | 37.4 | 37.4 | 71.1 | 85.3 | 244.0 | 108.0 | 63.3 | 130.6 |
| D80/D20 | 1.66 | 1.94 | 2.02 | 2.66 | 2.02 | 2.99 | 1.94 | 3.46 | 1.77 | 2.02 | 3.24 |
| D80-D20, μm | 9.88 | 17.80 | 27.87 | 26.17 | 37.22 | 46.01 | 50.88 | 169.92 | 67.01 | 34.84 | 84.70 |
| D95-D10, μm | 21.03 | 33.63 | 64.02 | 43.70 | 74.87 | 87.68 | 103.71 | 294.62 | 130.79 | 80.03 | 161.02 |
| D95-D50, μm | 14.46 | 23.81 | 39.18 | 27.24 | 42.96 | 57.55 | 65.89 | 201.42 | 74.35 | 48.97 | 105.28 |
| D50-D10, μm | 6.57 | 9.82 | 24.85 | 16.46 | 31.91 | 30.13 | 37.82 | 93.20 | 56.44 | 31.06 | 55.74 |
| Span, (D90/D10)/D50 | 0.85 | 0.98 | 1.25 | 1.33 | 1.14 | 1.61 | 1.12 | 1.83 | 0.91 | 1.25 | 1.69 |
| Wt. % >150 μm | 0.00 | 0.00 | 0.43 | 0.00 | 0.35 | 0.98 | 5.81 | 48.14 | 15.32 | 1.58 | 10.96 |
| Wt. % >100 μm | 0 | 0 | 2.21 | 0.00 | 5.51 | 6.74 | 33.74 | 69.17 | 31.61 | 5.72 | 35.61 |
| Wt. % >75 μm | 0 | 0.44 | 5.72 | 0.20 | 19.59 | 17.26 | 60.36 | 79.33 | 85.42 | 21.07 | 52.6 |
| Wt. % >50 μm | 0.50 | 8.12 | 15.26 | 11.19 | 62.89 | 47.54 | 87.63 | 86.15 | 92.22 | 55.69 | 72.79 |
| Particles/g >150 μm | 0 | 0 | 8.46E+03 | 0 | 4.33E+03 | 7.16E+03 | 5.85E+04 | 3.62E+05 | 1.32E+05 | 1.36E+04 | 1.10E+05 |
| Particles/g >100 μm | 0 | 0 | 7.89E+04 | 0 | 2.02E+05 | 1.52E+05 | 1.03E+06 | 8.43E+05 | 1.27E+06 | 2.21E+05 | 8.91E+05 |
| Particles/g >75 μm | 0 | 4.7E+04 | 7.77E+05 | 1.49E+04 | 1.46E+06 | 7.93E+05 | 3.28E+06 | 2.36E+06 | 2.17E+06 | 1.28E+06 | 2.10E+06 |
| Particles/g >50 μm | 2.04E+05 | 3.2E+06 | 7.06E+06 | 2.33E+06 | 1.23E+07 | 6.20E+06 | 9.25E+06 | 5.20E+06 | 3.18E+06 | 1.11E+07 | 5.97E+06 |
| Wt. % <10 μm | 1.33 | 0.48 | 2.10 | 4.98 | 1.49 | 13.26 | 1.70 | 3.66 | 1.88 | 5.07 | 3.27 |
| Wt. % <15 μm | 12.55 | 3.52 | 5.35 | 19.48 | 5.24 | 18.89 | 4.26 | 5.39 | 3.57 | 8.14 | 6.33 |

TABLE 2

| Ethylene, wt % | 3.82 | 3.52 | 3.11 | 2.75 | 2.48 | 3.11 | 3.11 | 3.11 |
|---|---|---|---|---|---|---|---|---|
| Temperature, ° C. | 105 | 105 | 105 | 105 | 105 | 105 | 105 | 95 |
| Induction time, min | 3.6 | 5.5 | 8.5 | 11.5 | 14.0 | 8.5 | 8.5 | 12.0 |
| Residence time, min | 60 | 60 | 60 | 60 | 60 | 40 | 80 | 60 |
| Productivity, g/g | 4293 | 3929 | 3416 | 2970 | 2643 | 1833 | 5157 | 2901 |
| Film thickness, μm | 25 | 25 | 25 | 25 | 25 | 25 | 25 | 25 |
| Gels >200 μm/sqft (Catalyst particles >100 μm) in polymers made with the following catalysts: | | | | | | | | |
| Inventive catalyst 1 | 0 | 0 | 0 | 0 | 0 | 0 | 0 | 0 |
| Inventive catalyst 2 | 0 | 0 | 0 | 0 | 0 | 0 | 0 | 0 |
| Inventive catalyst 3 | 2 | 3 | 7 | 10 | 13 | 18 | 3 | 11 |
| Inventive catalyst 4 | 0 | 0 | 0 | 0 | 0 | 0 | 0 | 0 |
| Comparative catalyst 1 | 12 | 18 | 34 | 50 | 67 | 93 | 17 | 56 |
| Comparative catalyst 2 | 8 | 12 | 23 | 33 | 45 | 62 | 12 | 38 |
| Comparative catalyst 3 | 47 | 68 | 134 | 194 | 261 | 361 | 68 | 219 |
| Comparative catalyst 4 | 37 | 53 | 104 | 150 | 202 | 280 | 52 | 169 |
| Comparative catalyst 5 | 38 | 55 | 108 | 156 | 210 | 291 | 54 | 176 |
| Comparative catalyst 6 | 7 | 10 | 19 | 27 | 36 | 50 | 9 | 31 |
| Comparative catalyst 7 | 27 | 39 | 75 | 109 | 147 | 204 | 38 | 123 |
| Gels >150 μm/sqft (Catalyst particles >75 μm) in polymers made with the following catalysts: | | | | | | | | |
| Inventive catalyst 1 | 0 | 0 | 0 | 0 | 0 | 0 | 0 | 0 |
| Inventive catalyst 2 | 7 | 10 | 19 | 27 | 37 | 51 | 9 | 31 |
| Inventive catalyst 3 | 23 | 34 | 66 | 95 | 129 | 178 | 33 | 108 |
| Inventive catalyst 4 | 2 | 3 | 6 | 9 | 12 | 16 | 3 | 10 |
| Comparative catalyst 1 | 77 | 111 | 217 | 314 | 423 | 585 | 109 | 354 |
| Comparative catalyst 2 | 39 | 56 | 110 | 159 | 215 | 297 | 55 | 179 |
| Comparative catalyst 3 | 133 | 191 | 374 | 542 | 730 | 1010 | 189 | 611 |
| Comparative catalyst 4 | 71 | 102 | 200 | 290 | 391 | 541 | 101 | 327 |
| Comparative catalyst 5 | 65 | 94 | 183 | 266 | 358 | 495 | 93 | 300 |

TABLE 2-continued

| | | | | | | | | |
|---|---|---|---|---|---|---|---|---|
| Comparative catalyst 6 | 38 | 55 | 108 | 257 | 212 | 293 | 55 | 177 |
| Comparative catalyst 7 | 63 | 91 | 178 | 258 | 348 | 481 | 90 | 291 |
| Gels >100 µm/sqft (Catalyst particles >50 µm) in polymers made with the following catalysts: | | | | | | | | |
| Inventive catalyst 1 | 12 | 17 | 34 | 49 | 66 | 91 | 17 | 55 |
| Inventive catalyst 2 | 95 | 137 | 268 | 389 | 524 | 725 | 136 | 438 |
| Inventive catalyst 3 | 212 | 306 | 597 | 866 | 1167 | 1614 | 302 | 976 |
| Inventive catalyst 4 | 126 | 182 | 356 | 517 | 696 | 962 | 180 | 582 |
| Comparative catalyst 1 | 474 | 683 | 1336 | 1937 | 2609 | 3609 | 675 | 2182 |
| Comparative catalyst 2 | 271 | 391 | 764 | 1109 | 1493 | 2066 | 386 | 1249 |
| Comparative catalyst 3 | 305 | 440 | 860 | 1247 | 1680 | 2323 | 435 | 1405 |
| Comparative catalyst 4 | 156 | 225 | 441 | 639 | 861 | 1190 | 223 | 720 |
| Comparative catalyst 5 | 96 | 138 | 269 | 391 | 526 | 728 | 136 | 440 |
| Comparative catalyst 6 | 334 | 482 | 942 | 1366 | 1840 | 2545 | 476 | 1539 |
| Comparative catalyst 7 | 179 | 259 | 506 | 733 | 988 | 1366 | 255 | 826 |

TABLE 3

| | | | | | | | |
|---|---|---|---|---|---|---|---|
| Ethylene, wt % | 3.80 | 3.80 | 3.80 | 3.80 | 3.80 | 3.80 | 4.40 |
| Temperature, ° C. | 105 | 105 | 105 | 105 | 105 | 105 | 105 |
| Poison level, DES/Cr | 0 | 0.10 | 0.20 | 0.30 | 0.40 | 0.40 | 0.40 |
| Induction time, min | 3.6 | 6.2 | 10.8 | 18.0 | 36.0 | 36.0 | 23.0 |
| Residence time, min | 65 | 65 | 65 | 65 | 65 | 95 | 65 |
| Productivity, g/g | 4941 | 4488 | 3784 | 2898 | 1488 | 2892 | 2408 |
| Film thickness, µm | 25 | 25 | 25 | 25 | 25 | 25 | 25 |
| Gels >200 µm/sqft (Catalyst particles >100 µm) in polymers made with the following catalysts: | | | | | | | |
| Inventive catalyst 1 | 0 | 0 | 0 | 0 | 0 | 0 | 0 |
| Inventive catalyst 2 | 0 | 0 | 0 | 0 | 0 | 0 | 0 |
| Inventive catalyst 3 | 2 | 3 | 7 | 15 | 49 | 19 | 21 |
| Inventive catalyst 4 | 0 | 0 | 0 | 0 | 0 | 0 | 0 |
| Comparative catalyst 1 | 10 | 18 | 36 | 75 | 250 | 95 | 110 |
| Comparative catalyst 2 | 7 | 12 | 24 | 50 | 167 | 64 | 74 |
| Comparative catalyst 3 | 38 | 69 | 141 | 292 | 975 | 371 | 430 |
| Comparative catalyst 4 | 30 | 53 | 110 | 226 | 755 | 287 | 333 |
| Comparative catalyst 5 | 31 | 55 | 114 | 235 | 784 | 298 | 346 |
| Comparative catalyst 6 | 5 | 10 | 20 | 41 | 136 | 52 | 60 |
| Comparative catalyst 7 | 22 | 39 | 80 | 165 | 550 | 209 | 242 |
| Gels >150 µm/sqft (Catalyst particles >70 µm) in polymers made with the following catalysts: | | | | | | | |
| Inventive catalyst 1 | 0 | 0 | 0 | 0 | 0 | 0 | 0 |
| Inventive catalyst 2 | 5 | 10 | 20 | 41 | 137 | 52 | 60 |
| Inventive catalyst 3 | 19 | 34 | 70 | 144 | 480 | 182 | 211 |
| Inventive catalyst 4 | 2 | 3 | 6 | 13 | 43 | 16 | 19 |
| Comparative catalyst 1 | 62 | 111 | 229 | 473 | 1578 | 600 | 696 |
| Comparative catalyst 2 | 31 | 56 | 116 | 240 | 800 | 305 | 353 |
| Comparative catalyst 3 | 107 | 192 | 395 | 816 | 2723 | 1036 | 1200 |
| Comparative catalyst 4 | 57 | 103 | 212 | 437 | 1458 | 555 | 643 |
| Comparative catalyst 5 | 52 | 94 | 194 | 400 | 1336 | 508 | 589 |
| Comparative catalyst 6 | 31 | 56 | 115 | 236 | 789 | 300 | 348 |
| Comparative catalyst 7 | 51 | 91 | 188 | 388 | 1297 | 493 | 572 |
| Gels >100 µm/sqft (Catalyst particles >50 µm) in polymers made with the following catalysts: | | | | | | | |
| Inventive catalyst 1 | 10 | 17 | 36 | 73 | 245 | 93 | 108 |
| Inventive catalyst 2 | 76 | 138 | 284 | 585 | 1955 | 744 | 862 |
| Inventive catalyst 3 | 170 | 307 | 632 | 1304 | 4353 | 1657 | 1919 |
| Inventive catalyst 4 | 102 | 183 | 377 | 777 | 2595 | 988 | 1144 |
| Comparative catalyst 1 | 381 | 686 | 1413 | 2915 | 9732 | 3703 | 4290 |
| Comparative catalyst 2 | 218 | 393 | 809 | 1668 | 5570 | 2120 | 2455 |
| Comparative catalyst 3 | 245 | 442 | 909 | 1876 | 6265 | 2384 | 2762 |
| Comparative catalyst 4 | 126 | 226 | 446 | 961 | 3210 | 1221 | 1415 |
| Comparative catalyst 5 | 77 | 138 | 285 | 588 | 1964 | 747 | 1059 |
| Comparative catalyst 6 | 268 | 484 | 996 | 2055 | 6862 | 2611 | 3025 |
| Comparative catalyst 7 | 144 | 260 | 535 | 1103 | 3683 | 1402 | 1624 |

TABLE 4

| Grade | HLMI g/10 min | Density g/cm$^3$ | Ash ppm | Mw kg/mol | Mw/Mn | CY-a | Tau sec |
|---|---|---|---|---|---|---|---|
| Type A-1 | 30-35 | 0.952-0.956 | 350-450 | 120-210 | 4.5-10.5 | 0.11-0.15 | 1-6 |
| Type A-2 | 24-30 | 0.948-0.952 | 350-450 | 115-175 | 5-9 | 0.13-0.16 | 1-4 |
| Type D-1 | 20-25 | 0.935-0.940 | 250-350 | 100-200 | 2.2-18 | 0.16-0.20 | 0.8-1.5 |
| Type B-1 | 12-16 | 0.944-0.948 | 250-350 | 180-250 | 10-25 | 0.16-0.20 | 1-2 |
| Type C | 9-13 | 0.936-0.940 | 250-350 | 180-250 | 10-20 | 0.13-0.18 | 6-26 |
| Type D-2 | 19-24 | 0.935-0.940 | 250-350 | 130-230 | 3-22 | 0.15-0.20 | 0.8-3 |
| Type E | 8-12 | 0.935-0.940 | 350-450 | 125-275 | 2-30 | 0.12-0.18 | 8-30 |
| Type B-2 | 8-12 | 0.946-0.950 | 450-550 | 160-230 | 6-25 | 0.12-0.16 | 20-50 |

TABLE 5

| Catalyst Type | Ash Content wt. % | Ash Content ppm | Measured Total 200+ μm Gels gels/sqft | Catalyst Gels per 10 sampled | Total Catalyst gels/sqft | Predicted Catalyst gels/sqft | Gels from Equation in FIG. 9 | Gels from Equation in FIG. 11 |
|---|---|---|---|---|---|---|---|---|
| CC-3 | 0.032 | 320 | 46 | 9 | 41 | 30 | 13 | 27 |
| CC-3 | 0.029 | 290 | 46 | 8 | 37 | 20 | 11 | 18 |
| CC-3 | 0.026 | 260 | 51 | 9 | 46 | 55 | 9 | 12 |
| CC-3 | 0.028 | 280 | 58 | 10 | 58 | 50 | 11 | 16 |
| CC-3 | 0.029 | 290 | 67 | 9 | 60 | 71 | 11 | 18 |
| CC-3 | 0.031 | 310 | 100 | 10 | 100 | 140 | 13 | 24 |
| CC-3 | 0.031 | 310 | 84 | 10 | 84 | 95 | 13 | 24 |
| CC-3 | 0.030 | 300 | 76 | 10 | 76 | 70 | 12 | 21 |
| CC-3 | 0.031 | 310 | 78 | 10 | 78 | 85 | 13 | 24 |
| CC-3 | 0.031 | 310 | 78 | 10 | 78 | 79 | 13 | 24 |
| CC-3 | 0.032 | 320 | 85 | 10 | 85 | 90 | 13 | 27 |
| CC-3 | 0.034 | 340 | 90 | 10 | 90 | 81 | 15 | 35 |
| CC-3 | 0.033 | 330 | 113 | 10 | 113 | 125 | 14 | 31 |
| CC-3 | 0.030 | 300 | 83 | 9 | 75 | 80 | 12 | 21 |
| CC-3 | 0.032 | 320 | 90 | 10 | 90 | 85 | 13 | 27 |
| CC-3 | 0.039 | 390 | 172 | 9 | 155 | 155 | 18 | 57 |
| CC-3 | 0.038 | 380 | 241 | 9 | 217 | 240 | 17 | 52 |
| CC-3 | 0.040 | 400 | 276 | 9 | 248 | 230 | 19 | 63 |
| CC-3/4 | 0.040 | 400 | 192 | 10 | 192 | 240 | 19 | 63 |
| CC-4 | 0.040 | 400 | 231 | 10 | 231 | 245 | 19 | 63 |
| CC-3 | 0.037 | 370 | 112 | 10 | 112 | 80 | 17 | 48 |
| CC-3 | 0.040 | 400 | 94 | 9 | 85 | 78 | 19 | 63 |
| CC-3 | 0.040 | 400 | 155 | 10 | 155 | 190 | 19 | 63 |
| CC-3 | 0.039 | 390 | 126 | 10 | 126 | 136 | 18 | 57 |
| CC-3 | 0.038 | 380 | 143 | 9 | 129 | 136 | 18 | 57 |
| CC-3/4 | 0.032 | 320 | 74 | 10 | 74 | 81 | 13 | 27 |
| CC-4 | 0.032 | 320 | 218 | 3 | 65 | 76 | 13 | 27 |
| CC-3/4 | 0.025 | 250 | 82 | 10 | 82 | 95 | 9 | 11 |
| CC-3 | 0.028 | 280 | 98 | 10 | 98 | 150 | 11 | 16 |
| CC-3 | 0.028 | 280 | 128 | 10 | 128 | 122 | 11 | 16 |
| CC-3 | 0.028 | 280 | 134 | 9 | 121 | 114 | 11 | 16 |
| CC-3 | 0.028 | 280 | 137 | 9 | 123 | 126 | 11 | 16 |
| CC-3 | 0.032 | 320 | 196 | 6 | 118 | 126 | 13 | 27 |
| CC-3 | 0.030 | 300 | 199 | 6 | 119 | 126 | 12 | 21 |
| CC-3 | 0.029 | 290 | 204 | 4 | 82 | 93 | 11 | 18 |
| CC-3 | 0.028 | 280 | 140 | 6 | 84 | 79 | 11 | 16 |
| CC-3 | 0.026 | 260 | 152 | 4 | 61 | 70 | 9 | 12 |
| CC-3 | 0.027 | 270 | 152 | 4 | 61 | 98 | 10 | 14 |
| CC-3 | 0.026 | 260 | 137 | 5 | 69 | 80 | 9 | 12 |
| CC-3 | 0.027 | 270 | 129 | 5 | 65 | 65 | 10 | 14 |
| CC-3 | 0.027 | 270 | 127 | 5 | 64 | 74 | 10 | 14 |
| CC-3 | 0.026 | 260 | 118 | 6 | 71 | 60 | 9 | 12 |
| CC-3 | 0.026 | 260 | 135 | 5 | 68 | 80 | 9 | 12 |
| CC-3 | 0.027 | 270 | 130 | 5 | 65 | 50 | 10 | 14 |
| CC-3 | 0.025 | 250 | 117 | 5 | 59 | 43 | 9 | 11 |
| CC-3 | 0.026 | 260 | 120 | 5 | 60 | 77 | 9 | 12 |
| CC-3 | 0.024 | 240 | 58 | 9 | 52 | 40 | 8 | 9 |
| CC-3 | 0.027 | 270 | 116 | 6 | 70 | 40 | 10 | 14 |
| CC-3 | 0.027 | 270 | 124 | 5 | 62 | 75 | 10 | 14 |
| CC-3 | 0.026 | 260 | 126 | 5 | 63 | 65 | 9 | 12 |
| CC-3 | 0.026 | 260 | 127 | 5 | 64 | 55 | 9 | 12 |
| CC-3 | 0.026 | 260 | 138 | 5 | 69 | 65 | 9 | 12 |
| CC-3 | 0.025 | 250 | 118 | 5 | 59 | 70 | 9 | 11 |
| CC-3 | 0.026 | 260 | 124 | 5 | 62 | 65 | 9 | 12 |
| CC-3 | 0.027 | 270 | 144 | 5 | 72 | 60 | 10 | 14 |
| CC-3/4 | 0.026 | 260 | 127 | 5 | 64 | 65 | 9 | 12 |
| CC-4 | 0.027 | 270 | 116 | 6 | 70 | 65 | 10 | 14 |
| CC-4 | 0.024 | 240 | 87 | 6 | 52 | 63 | 8 | 9 |
| CC-4 | 0.022 | 217 | 97 | 25%* | 24 | 20 | 7 | 8 |
| CC-4 | 0.020 | 199 | 87 | 22%* | 19 | 20 | 6 | 9 |
| CC-4 | 0.023 | 232 | 106 | 23%* | 24 | 26 | 8 | 9 |
| IC-3 | 0.038 | 381 | 45 | 4 | 18 | 25 | 17 | 53 |
| IC-3 | 0.043 | 434 | 33 | 5 | 17 | 12 | 22 | 81 |
| IC-3 | 0.049 | 494 | 38 | 6 | 23 | 16 | 27 | 118 |

| 1 sqft of 25 um film = 2.32 | mL volume |
|---|---|
| density of polymer = 0.938 | g/mL |
| change of wt = 2.18 | g PE/sqft film |
| catalyst content = 0.0373% | % ash in PE |
| g catalyst = 0.00081 | g Cat/sqft film |

-continued

| catalyst density = 0.317 | g Cat per mL Cat |
|---|---|
| total cat vol/sqft = 2.563E−03 | mL Cat/sqft |

TABLE 7

| X diameter μm | Y % ash/ channel | Particle Volume mL per particle | Cat Vol Partition mL cat/ sqft/ channel | Particle Count # particles/ sqft film/ channel |
|---|---|---|---|---|
| 704.00 | 0.000% | 1.83E−04 | 0.00E+00 | 0 |
| 645.60 | 0.000% | 1.41E−04 | 0.00E+00 | 0 |
| 592.00 | 0.000% | 1.09E−04 | 0.00E+00 | 0 |
| 542.90 | 0.000% | 8.37E−05 | 0.00E+00 | 0 |
| 497.80 | 0.000% | 6.46E−05 | 0.00E+00 | 0 |
| 456.50 | 0.000% | 4.98E−05 | 0.00E+00 | 0 |
| 418.60 | 0.000% | 3.84E−05 | 0.00E+00 | 0 |
| 383.90 | 0.035% | 2.96E−05 | 8.96E−07 | 0 |
| 352.00 | 0.140% | 2.28E−05 | 3.58E−06 | 0.2 |
| 322.80 | 0.250% | 1.76E−05 | 6.40E−06 | 0.4 |
| 296.00 | 0.320% | 1.36E−05 | 8.19E−06 | 0.6 |
| 271.40 | 0.380% | 1.05E−05 | 9.73E−06 | 0.9 |
| 248.90 | 0.419% | 8.07E−06 | 1.08E−05 | 1.3 |
| 228.20 | 0.469% | 6.22E−06 | 1.20E−05 | 1.9 |
| 209.30 | 0.489% | 4.80E−06 | 1.25E−05 | 2.6 |
| 191.90 | 0.519% | 3.70E−06 | 1.33E−05 | 3.6 |
| 176.00 | 0.549% | 2.85E−06 | 1.41E−05 | 4.9 |
| 161.40 | 0.569% | 2.20E−06 | 1.46E−05 | 6.6 |
| 148.00 | 0.589% | 1.31E−06 | 1.51E−05 | 11.6 |
| 135.70 | 0.599% | 1.01E−06 | 1.54E−05 | 15.2 |
| 124.50 | 0.619% | 7.77E−07 | 1.59E−05 | 20.4 |
| 114.10 | 0.619% | 6.01E−07 | 1.59E−05 | 26.4 |
| 104.70 | 0.629% | 6.01E−07 | 1.61E−05 | 26.9 |
| 95.96 | 0.619% | 4.62E−07 | 1.59E−05 | 34.3 |

TABLE 8

| X diameter μm | Particle Count # particles Sqft film// channel |
|---|---|
| 114.10 | 0 |
| 104.70 | 0 |
| 95.96 | 0 |
| 88.00 | 0 |
| 80.70 | 0 |
| 74.00 | 0 |
| 67.86 | 0 |
| 62.23 | 0 |
| 57.06 | 20 |
| 52.33 | 43 |
| 47.98 | 70 |

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of"):

Aspect 1. A supported chromium (VI) catalyst comprising a solid oxide; from 0.05 to 5 wt. % (or 0.1 to 0.75 wt. %, or 0.2 to 0.75 wt. %) chromium; and from 0.2 to 20 wt. % (or 0.2 to 6 wt. %, or 0.2 to 3 wt. %) carbon; wherein the solid oxide (or the catalyst) has (or is characterized by) an amount of the solid oxide (or the catalyst) with a particle size greater than 100 μm of less than or equal to 3 wt. %; and a particle size span ((d90−d10)/d50) in a range from 0.5 to 1.4.

Aspect 2. A supported chromium (VI) catalyst comprising a solid oxide; from 0.05 to 5 wt. % (or 0.1 to 0.75 wt. %, or 0.2 to 0.75 wt. %) chromium; and from 0.2 to 20 wt. % (or 0.2 to 6 wt. %, or 0.2 to 3 wt. %) carbon; wherein the solid oxide (or the catalyst) has (or is characterized by) an amount of the solid oxide (or the catalyst) with a particle size greater than 100 μm of less than or equal to 0.5 wt. % and an amount of the solid oxide (or the catalyst) with a particle size less than 10 μm of less than or equal to 10 wt. %.

Aspect 3. A supported chromium (VI) catalyst comprising a solid oxide; and from 0.05 to 5 wt. % (or 0.1 to 0.75 wt. %, or 0.2 to 0.75 wt. %) chromium, wherein the chromium has at least one triphenylsilyl ligand (attached to the chromium); wherein the solid oxide (or the catalyst) has (or is characterized by) an amount of the solid oxide (or the catalyst) with a particle size greater than 100 μm of less than or equal to 3 wt. %; and a particle size span ((d90−d10)/d50) in a range from 0.5 to 1.4.

Aspect 4. A supported chromium (VI) catalyst comprising a solid oxide; and from 0.05 to 5 wt. % (or 0.1 to 0.75 wt. %, or 0.2 to 0.75 wt. %) chromium, wherein the chromium has at least one triphenylsilyl ligand; wherein the solid oxide (or the catalyst) has (or is characterized by) an amount of the solid oxide (or the catalyst) with a particle size greater than 100 μm of less than or equal to 0.5 wt. % and an amount of the solid oxide (or the catalyst) with a particle size less than 10 μm of less than or equal to 10 wt. %.

Aspect 5. The catalyst defined in any one of aspects 1-4, wherein the catalyst is treated (or reduced) with an organo-aluminium compound (e.g., diethylaluminum ethoxide) at a molar ratio of aluminum to chromium of from 1:1 to 10:1, from 2:1 to 5:1, or from 2:1 to 3:1 (and the catalyst is no longer chromium (VI)).

Aspect 6. The catalyst defined in any one of aspects 1-5, wherein the amount of the solid oxide (or the catalyst) with a particle size greater than 100 μm is in any range disclosed herein, e.g., less than or equal to 2 wt. %, less than or equal to 1 wt. %, less than or equal to 0.5 wt. %, less than or equal to 0.35 wt. %, less than or equal to 0.2 wt. %, or less than or equal to 0.1 wt. %.

Aspect 7. The catalyst defined in any one of the preceding aspects, wherein the solid oxide (or the catalyst) has a particle size span ((d90−d10)/d50) in any range disclosed herein, e.g., from 0.5 to 1.4, from 0.6 to 1.4, from 0.7 to 1.4, from 0.6 to 1.35, from 0.7 to 1.35, from 0.8 to 1.35, from 0.7 to 1.1, or from 0.8 to 1.1.

Aspect 8. The catalyst defined in any one of the preceding aspects, wherein the amount of the solid oxide (or the catalyst) with a particle size less than 10 μm is in any range disclosed herein, e.g., less than or equal to 10 wt. %, less than or equal to 7 wt. %, less than or equal to 5 wt. %, less than or equal to 3 wt. %, or less than or equal to 2 wt. %.

Aspect 9. The catalyst defined in any one of the preceding aspects, wherein the solid oxide (or the catalyst) has a d50 average particle size in any range disclosed herein, e.g., from 15 to 60 μm, from 15 to 50 μm, from 15 to 40 μm, from 17 to 45 μm, or from 17 to 32 μm.

Aspect 10. The catalyst defined in any one of the preceding aspects, wherein the solid oxide (or the catalyst) has a ratio of d80/d20 in any range disclosed herein, e.g., from 1.3 to 2.8, from 1.3 to 2.2, from 1.4 to 2.8, from 1.4 to 2.2, from 1.5 to 2.7, or from 1.5 to 2.1.

Aspect 11. The catalyst defined in any one of the preceding aspects, wherein the solid oxide (or the catalyst) has a d10 particle size in any range disclosed herein, e.g., greater than or equal to 10 μm, greater than or equal to 11 μm, in a range from 10 to 25 μm, or in a range from 10 to 20 μm.

Aspect 12. The catalyst defined in any one of the preceding aspects, wherein the solid oxide (or the catalyst) has a d95 particle size in any range disclosed herein, e.g., from 25 to 88 μm, from 28 to 85 μm, from 30 to 82 μm, from 25 to 65 μm, or from 30 to 55 μm.

Aspect 13. The catalyst defined in any one of the preceding aspects, wherein the amount of the solid oxide (or the catalyst) with a particle size greater than 75 μm is in any range disclosed herein, e.g., less than or equal to 10 wt. %, less than or equal to 6.5 wt. %, less than or equal to 4 wt. %, less than or equal to 2.5 wt. %, less than or equal to 1.5 wt. %, or less than or equal to 1 wt. %.

Aspect 14. The catalyst defined in any one of the preceding aspects, wherein the amount of the solid oxide (or the catalyst) with a particle size less than 15 μm is in any range disclosed herein, e.g., less than or equal to 20 wt. %, less than or equal to 18 wt. %, less than or equal to 15 wt. %, less than or equal to 13 wt. %, or less than or equal to 8 wt. %.

Aspect 15. The catalyst defined in any one of the preceding aspects, wherein the number of the solid oxide (or the catalyst) particles with a particle size greater than 150 μm is in any range disclosed herein, e.g., less than or equal to 10,000, less than or equal to 1000, less than or equal to 100, or less than or equal to 50, per gram of the solid oxide (or the catalyst).

Aspect 16. The catalyst defined in any one of the preceding aspects, wherein the number of the solid oxide (or the catalyst) particles with a particle size greater than 100 μm is in any range disclosed herein, e.g., less than or equal to 100,000, less than or equal to 10,000, less than or equal to 1000, less than or equal to 100, or less than or equal to 50, per gram of the solid oxide (or the catalyst).

Aspect 17. The catalyst defined in any one of the preceding aspects, wherein the number of the solid oxide (or the catalyst) particles with a particle size greater than 75 μm is in any range disclosed herein, e.g., less than or equal to 100,000, less than or equal to 50,000, less than or equal to 10,000, less than or equal to 1000, or less than or equal to 100, per gram of the solid oxide (or the catalyst).

Aspect 18. The catalyst defined in any one of the preceding aspects, wherein the solid oxide is silica, silica-alumina, silica-coated alumina, silica-titania, silica-titania-magnesia, silica-zirconia, silica-magnesia, silica-boria, aluminophosphate-silica, or any combination thereof; alternatively, silica; or alternatively, silica-titania.

Aspect 19. The catalyst defined in any one of the preceding aspects, wherein the amount of chromium is in any range disclosed herein, e.g., from 0.05 to 5 wt. %, from 0.05 to 1 wt. %, from 0.1 to 1.5 wt. %, from 0.1 to 0.75 wt. %, from 0.1 to 0.4 wt. %, from 0.2 to 2 wt. %, from 0.2 to 0.75 wt. %, or from 0.2 to 0.3 wt. % chromium, based on the total weight of the catalyst.

Aspect 20. The catalyst defined in any one of the preceding aspects, wherein the solid oxide (or the catalyst) has a pore volume (total) in any suitable range, or any range disclosed herein, e.g., from 0.5 to 5 mL/g, from 1 to 5 mL/g, from 1 to 3 mL/g, from 1.2 to 2.5 mL/g, or from 1.3 to 1.8 mL/g.

Aspect 21. The catalyst defined in any one of the preceding aspects, wherein the solid oxide (or the catalyst) has a BET surface area in any suitable range, or any range disclosed herein, e.g., from 200 to 700 m²/g, from 250 to 550 m²/g, from 250 to 400 m²/g, from 275 to 525 m²/g, or from 400 to 600 m²/g.

Aspect 22. The catalyst defined in any one of the preceding aspects, wherein the amount of carbon is in any range disclosed herein, e.g., from 0.2 to 20 wt. %, from 0.2 to 6 wt. %, from 0.2 to 3 wt. %, from 0.5 to 8 wt. %, from 0.5 to 2 wt. %, or from 0.5 to 1 wt. % carbon, based on the total weight of the catalyst.

Aspect 23. The catalyst defined in any one of the preceding aspects, wherein at least 60 wt. %, at least 75 wt. %, at least 85 wt. %, or at least 95 wt. %, of the chromium is present in an oxidation state of six (Cr+6).

Aspect 24. The catalyst defined in any one of the preceding aspects, wherein the average sphericity of the catalyst (measured using microscopy), is in the range from 0.5 to 1.0, from 0.6 to 1, or from 0.7 to 1.0.

Aspect 25. The catalyst defined in any one of the preceding aspects, wherein the catalyst does not require high temperature activation or calcination (e.g., chromium is added after calcination of the solid oxide).

Aspect 26. A polymerization process comprising contacting the catalyst defined in any one of aspects 1-25 with an olefin monomer and an optional olefin comonomer in a polymerization reactor system under polymerization conditions to produce an olefin polymer.

Aspect 27. The process defined in aspect 26, wherein the olefin monomer comprises any olefin monomer disclosed herein, e.g., any $C_2$-$C_{20}$ olefin.

Aspect 28. The process defined in any one of aspects 26-27, wherein the olefin monomer and the optional olefin comonomer independently comprise a $C_2$-$C_{20}$ alpha-olefin.

Aspect 29. The process defined in any one of aspects 26-28, wherein the olefin monomer comprises ethylene.

Aspect 30. The process defined in any one of aspects 26-29, wherein the catalyst is contacted with ethylene and an olefin comonomer comprising a $C_3$-$C_{10}$ alpha-olefin.

Aspect 31. The process defined in any one of aspects 26-30, wherein the catalyst is contacted with ethylene and an olefin comonomer comprising 1-butene, 1-hexene, 1-octene, or a mixture thereof.

Aspect 32. The process defined in any one of aspects 26-31, wherein the polymerization reactor system comprises a slurry reactor, a gas-phase reactor, a solution reactor, a multizone circulating reactor, or a combination thereof; alternatively, a loop slurry reactor; or alternatively, a fluidized bed reactor.

Aspect 33. The process defined in any one of aspects 26-32, wherein the polymerization reactor system comprises two or more reactors.

Aspect 34. The process defined in any one of aspects 26-33, wherein the olefin polymer comprises any olefin polymer disclosed herein.

Aspect 35. The process defined in any one of aspects 26-34, wherein the olefin polymer comprises an ethylene homopolymer, an ethylene/1-butene copolymer, an ethylene/1-hexene copolymer, and/or an ethylene/1-octene copolymer.

Aspect 36. The process defined in any one of aspects 26-35, wherein the olefin polymer comprises an ethylene/1-hexene copolymer.

Aspect 37. The process defined in any one of aspects 26-36, wherein the polymerization conditions comprise a polymerization reaction temperature in a range from 60° C. to 120° C. and a reaction pressure in a range from 200 to 1000 psig (1.4 to 6.9 MPa).

Aspect 38. The process defined in any one of aspects 26-37, wherein the polymerization conditions are substantially constant, e.g., for a particular polymer grade.

Aspect 39. The process defined in any one of aspects 26-38, wherein no hydrogen is added to the polymerization reactor system.

Aspect 40. The process defined in any one of aspects 26-39, wherein hydrogen is added to the polymerization reactor system.

Aspect 41. The process defined in any one of aspects 26-40, wherein the olefin polymer contains, independently, less than 0.1 ppm (by weight), less than 0.08 ppm, less than 0.05 ppm, or less than 0.03 ppm, of Mg, V, Ti, Zr, or Hf.

Aspect 42. The process defined in any one of aspects 26-41, wherein the olefin polymer is characterized by a film gel count in any range disclosed herein, e.g., less than or equal to 15, less than or equal to 12, less than or equal to 10, less than or equal 8, less than or equal to 5, or less than or equal to 2 gels per ft$^2$ of 25 micron thick film (gels encompass a size (diameter) greater than 200 μm caused by catalyst particles).

Aspect 43. An olefin polymer produced by the process defined in any one of aspects 26-42.

Aspect 44. An ethylene polymer (e.g., beads or pellets) having (or characterized by) a high load melt index (HLMI) in a range from 4 to 70 g/10 min; a density in a range from 0.93 to 0.96 g/cm$^3$; and a film gel count of less than or equal to 15 catalyst particle gels per ft$^2$ of 25 micron thick film (or less than or equal to 12, or less than or equal to 10, or less than or equal to 8, or less than or equal to 5, or less than or equal to 2, gels per ft$^2$ of 25 micron thick film), wherein film gels encompass a size (diameter) greater than 200 μm caused by catalyst particles; and wherein the ethylene polymer contains from 150 to 680 ppm solid oxide (e.g., silica) and from 0.5 to 3 ppm chromium.

Aspect 45. An ethylene polymer (e.g., beads or pellets) having (or characterized by): a high load melt index (HLMI) in a range from 4 to 70 g/10 min; a density in a range from 0.93 to 0.96 g/cm$^3$; and a gel count of less than or equal to 50 catalyst particles of greater than 100 μm (in diameter) per 5 grams of the ethylene polymer (or less than or equal to 40, or less than or equal to 30, or less than or equal to 20, or less than or equal to 10, or less than or equal to 5, or less than or equal to 2, or less than or equal to 1, catalyst particle(s) per 5 grams of the ethylene polymer); wherein the ethylene polymer contains from 150 to 680 ppm solid oxide (e.g., silica) and from 0.5 to 3 ppm chromium.

Aspect 46. The polymer defined in aspect 44 or 45, wherein the ethylene polymer has a HLMI in any range disclosed herein, e.g., from 4 to 50, from 6 to 36, from 6 to 15, from 20 to 40, or from 25 to 36 g/10 min.

Aspect 47. The polymer defined in any one of aspects 44-46, wherein the ethylene polymer has a density in any range disclosed herein, e.g., from 0.93 to 0.956, from 0.934 to 0.96, from 0.934 to 0.956, from 0.934 to 0.95, or from 0.945 to 0.958 g/cm$^3$.

Aspect 48. The polymer defined in any one of aspects 44-47, wherein the ethylene polymer contains, independently, less than 0.1 ppm (by weight), less than 0.08 ppm, less than 0.05 ppm, or less than 0.03 ppm, of Mg, V, Ti, Zr, or Hf.

Aspect 49. The polymer defined in any one of aspects 44-48, wherein the ethylene polymer contains from 0.5 to 2.5 ppm, from 0.5 to 2 ppm, from 0.75 to 3 ppm, or from 1 to 2 ppm of chromium.

Aspect 50. The polymer defined in any one of aspects 44-49, wherein the ethylene polymer contains from 180 to 600 ppm, from 200 to 680 ppm, from 200 to 600 ppm, from 200 to 500 ppm, from 150 to 600 ppm, from 150 to 550 ppm, or from 150 to 500 ppm of solid oxide.

Aspect 51. The polymer defined in any one of aspects 44-50, wherein the ethylene polymer has a Mw in any range disclosed herein, e.g., from 100,000 to 275,000, from 120, 000 to 240,000, or from 130,000 to 220,000 g/mol.

Aspect 52. The polymer defined in any one of aspects 44-51, wherein the ethylene polymer has a ratio of Mw/Mn in any range disclosed herein, e.g., from 3 to 25, from 4 to 20, or from 5 to 18.

Aspect 53. The polymer defined in any one of aspects 44-52, wherein the ethylene polymer has a CY-a parameter in any range disclosed herein, e.g., from 0.10 to 0.23, from 0.11 to 0.20, from 0.11 to 0.16, from 0.12 to 0.18, from 0.13 to 0.20, from 0.13 to 0.16, from 0.14 to 0.18, or from 0.18 to 0.22.

Aspect 54. The polymer defined in any one of aspects 44-53, wherein the ethylene polymer has a relaxation time in any range disclosed herein, e.g., from 0.5 to 50, from 0.8 to 10, from 0.8 to 5, from 0.8 to 3, from 4 to 40, or from 5 to 30 sec.

Aspect 55. The polymer defined in any one of aspects 44-54, wherein the ethylene polymer comprises an ethylene homopolymer and/or an ethylene/α-olefin copolymer.

Aspect 56. The polymer defined in any one of aspects 44-55, wherein the ethylene polymer comprises an ethylene homopolymer, an ethylene/1-butene copolymer, an ethylene/1-hexene copolymer, and/or an ethylene/1-octene copolymer.

Aspect 57. The polymer defined in any one of aspects 44-56, wherein the ethylene polymer comprises an ethylene/1-hexene copolymer.

Aspect 58. The polymer defined in any one of aspects 44-57 produced by the process defined in any one of aspects 26-42.

Aspect 59. An article comprising the ethylene polymer defined in any one of aspects 44-58.

Aspect 60. An article comprising the ethylene polymer defined in any one of aspects 44-58, wherein the article is an agricultural film, an automobile part, a bottle, a container for chemicals, a drum, a fiber or fabric, a food packaging film or container, a food service article, a fuel tank, a geomembrane, a household container, a liner, a molded product, a medical device or material, an outdoor storage product, outdoor play equipment, a pipe, a sheet or tape, a toy, or a traffic barrier.

Aspect 61. A film, pipe, or blow molded product comprising (or produced from) the polymer defined in any one of aspects 44-58.

Aspect 62. The article defined in any one of aspects 59-61, wherein the article has a gel count of less than or equal to 50 catalyst particles of greater than 100 μm (in diameter) per 5 grams of the article (or less than or equal to 40, or less than or equal to 30, or less than or equal to 20, or less than or equal to 10, or less than or equal to 5, or less than or equal to 2, or less than or equal to 1, catalyst particle(s) per 5 grams of the article).

We claim:

1. A supported chromium (VI) catalyst comprising:
a solid oxide comprising silica-coated alumina; and
from 0.05 to 5 wt. % chromium, wherein the chromium has at least one triphenylsilyl ligand;
wherein the solid oxide or the catalyst is characterized by:
an average sphericity in a range from 0.5 to 1.0;
a wet particle density in a range from 1.05 to 2.0 g/cc; and
(A) an amount of the solid oxide or the catalyst with a particle size greater than 100 μm of less than or equal to 3 wt. %, and a particle size span ((d90-d10)/d50) in a range from 0.5 to 1.4; or
(B) an amount of the solid oxide or the catalyst with a particle size greater than 100 μm of less than or equal to 0.5 wt. %, and an amount of the solid oxide or the catalyst with a particle size less than 10 μm of less than or equal to 10 wt. %; or both (A) and (B).

2. The catalyst of claim 1, wherein the catalyst is treated with an organoaluminium compound at a molar ratio of aluminum to chromium of from 1:1 to 10:1.

3. The catalyst of claim 2, wherein:

the catalyst comprises from 0.1 to 0.4 wt. % chromium;

the organoaluminium compound comprises diethylalumi-
num ethoxide; and the molar ratio of aluminum to chromium is from 2:1 to
5:1.

4. The catalyst of claim 1, wherein the silica-coated
alumina has an alumina content from 5 wt. % to 95 wt. %.

5. The catalyst of claim 1, wherein the silica-coated
alumina has an alumina content from 60 wt. % to 90 wt. %.

6. The catalyst of claim 1, wherein the average sphericity
of the catalyst is in a range from 0.7 to 1.0.

7. A polymerization process comprising contacting the
supported chromium catalyst of claim 1 and an optional
co-catalyst with an olefin monomer and an optional olefin
comonomer in a polymerization reactor system comprising
a fluidized bed reactor under polymerization conditions to
produce an olefin polymer.

8. The process of claim 7, wherein a linear velocity of a
fluidizing gas stream in the fluidized bed reactor is in a range
from 0.05 to 0.35 ft/sec.

9. A supported chromium (VI) catalyst comprising:

a solid oxide comprising silica-coated alumina;

from 0.05 to 5 wt. % chromium; and from 0.2 to 20 wt. % carbon;

wherein the solid oxide or the catalyst is characterized by:

an average sphericity in a range from 0.5 to 1.0;

a wet particle density in a range from 1.05 to 2.0 g/cc; and (A) an amount of the solid oxide or the catalyst with a
particle size greater than 100 μm of less than or equal
to 3 wt. %, and a particle size span ((d90-d10)/d50) in
a range from 0.5 to 1.4; or (B) an amount of the solid oxide or the catalyst with a
particle size greater than 100 μm of less than or equal
to 0.5 wt. %, and an amount of the solid oxide or the
catalyst with a particle size less than 10 μm of less than
or equal to 10 wt. %; or both (A) and (B).

10. The catalyst of claim 1, wherein:

the amount of the catalyst with a particle size greater than
100 μm is less than or equal to 2 wt. %; and the particle size span ((d90-d10)/d50) is in a range from
0.7 to 1.35.

11. The catalyst of claim 1, wherein:

the amount of the catalyst with a particle size greater than
100 μm is less than or equal to 0.35 wt. %; and the amount of the catalyst with a particle size less than 10
μm is less than or equal to 5 wt. %.

12. The catalyst of claim 1, wherein the catalyst comprises
from 0.1 to 0.4 wt. % chromium.

13. The catalyst of claim 12, wherein at least 75 wt. % of
the chromium is present in an oxidation state of six (Cr+6).

14. The catalyst of claim 1, wherein the catalyst has:

a total pore volume from 0.5 to 5 mL/g; and a BET surface area from 200 to 700 m²/g.

15. The catalyst of claim 1, wherein a number of catalyst
particles with a particle size greater than 75 μm is less than
or equal to 10,000 per gram of the catalyst.

16. The catalyst of claim 1, wherein the catalyst has a d50
average particle size from 15 to 50 μm.

17. The process of claim 8, wherein the olefin polymer
comprises an ethylene polymer having:

a high load melt index (HLMI) in a range from 4 to 70
g/10 min;

a density in a range from 0.93 to 0.96 g/cm³; and a film gel count of less than or equal to 15 catalyst particle
gels per ft² of 25 micron thick film, wherein film gels
encompass a size in diameter of greater than 200 μm
caused by the catalyst particles; and/or a gel count of less than or equal to 50 catalyst particles of
greater than 100 μm in diameter per 5 grams of the
ethylene polymer;

wherein the ethylene polymer contains from 150 to 680
ppm solid oxide and from 0.5 to 3 ppm chromium.

18. The catalyst of claim 9, wherein the catalyst comprises
from 0.5 to 8 wt. % carbon, and the silica-coated alumina has
an alumina content from 60 wt. % to 90 wt. %.

19. The catalyst of claim 9, wherein the catalyst comprises
from 0.1 to 0.4 wt. % chromium.

20. The catalyst of claim 19, wherein at least 85 wt. % of
the chromium is present in an oxidation state of six (Cr+6).

* * * * *